US012724337B2

(12) United States Patent
Tabayashi et al.

(10) Patent No.: US 12,724,337 B2
(45) Date of Patent: Sep. 1, 2026

(54) WAVELENGTH CONVERSION DEVICE, LIGHT SOURCE DEVICE, AND PROJECTOR

(71) Applicant: SEIKO EPSON CORPORATION, Tokyo (JP)

(72) Inventors: Kosuke Tabayashi, Azumino (JP); Norikazu Kadotani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 319 days.

(21) Appl. No.: 18/224,692

(22) Filed: Jul. 21, 2023

(65) Prior Publication Data

US 2024/0027883 A1 Jan. 25, 2024

(30) Foreign Application Priority Data

Jul. 22, 2022 (JP) ................................. 2022-117269

(51) Int. Cl.
*G03B 21/16* (2006.01)
*G02B 26/00* (2006.01)
*G03B 21/20* (2006.01)

(52) U.S. Cl.
CPC ........... *G03B 21/16* (2013.01); *G02B 26/008* (2013.01); *G03B 21/204* (2013.01)

(58) Field of Classification Search
None
See application file for complete search history.

(56) References Cited

U.S. PATENT DOCUMENTS

2019/0072245 A1 3/2019 Kobayashi et al.
2019/0146314 A1 5/2019 Yoshikawa
2020/0310233 A1* 10/2020 Kadotani ........... H05K 7/20327
2020/0409250 A1* 12/2020 Zhang .................. G02B 26/008

FOREIGN PATENT DOCUMENTS

CN 202040748 U 11/2011
JP 2016-170326 A 9/2016
JP 2017027685 A * 2/2017
JP 2019-091011 A 6/2019
JP 2020-160117 A 10/2020
JP 2021-81733 A 5/2021
WO WO-2020052256 A1 * 3/2020 ............. G03B 21/20

* cited by examiner

*Primary Examiner* — Bao-Luan Q Le
*Assistant Examiner* — Danell L Owens
(74) *Attorney, Agent, or Firm* — Oliff PLC

(57) ABSTRACT

A wavelength conversion device includes a rotating body having a disk-like shape, a wavelength converter disposed in a portion at circumferential edge side of the rotating body so as to form a ring-like shape centering on a rotational axis of the rotating body, and a motor configured to rotate the rotating body, wherein the rotating body includes a vapor chamber, the vapor chamber includes a sealed container configured to contain a working fluid changing in phase between a vapor phase and a liquid phase, the sealed container includes a heat receiver which is arranged in an outer circumferential part of the sealed container, and which is configured to receive heat of the wavelength converter, and a heat dissipater which is arranged at the rotational axis side of the heat receiver, and which is configured to release the heat received by the heat receiver.

17 Claims, 17 Drawing Sheets

1
3
2
34
343
344
342
352
351
35
341
36
352
354
332
351
355
354
33
352
351
333
331
36
324
323
322
Ax
32
321
31

WAVELENGTH CONVERSION DEVICE, LIGHT SOURCE DEVICE, AND PROJECTOR

The present application is based on, and claims priority from JP Application Serial Number 2022-117269, filed Jul. 22, 2022, the disclosure of which is hereby incorporated by reference herein in its entirety.

BACKGROUND

1. Technical Field

The present disclosure relates to a wavelength conversion device, a light source device, and a projector.

2. Related Art

In the past, there has been known a projector which modulates light emitted from alight source device to form image light, and then projects the image light thus formed. As the light source device to be adopted in such a projector, there has been known a light source device provided with a wavelength conversion device for converting the wavelength of the excitation light input to the wavelength conversion device and emitting the result (see, e.g., JP-A-2021-81733 (Document 1)).

In Document 1, there is disclosed a light source device provided with a so-called reflective wavelength conversion element, and a light source device provided with a so-called transmissive wavelength conversion element.

The transmissive wavelength conversion element emits fluorescence, which is converted light obtained by converting the wavelength of the excitation light, toward an opposite direction to an incident direction of the excitation light.

The transmissive wavelength conversion element emits the fluorescence along the incident direction of the excitation light.

The fluorescence emitted from the reflective wavelength conversion element and the fluorescence emitted from the transmissive wavelength conversion element are collected by a collecting lens such as a collimator lens.

The transmissive wavelength conversion element is apt to become large in beam diameter compared to the reflective wavelength conversion element. Therefore, since it is difficult to collect the converted light by the collecting lens, an amount of light which is not used in formation of the image light is apt to be large.

In contrast, it is conceivable to increase the intensity of the excitation light entering the transmissive wavelength conversion element to thereby compensate for the amount of the light which is not used in the formation of the image light.

However, there is a problem that when increasing the intensity of the excitation light entering the wavelength conversion element, the temperature of a phosphor included in the wavelength conversion element rises, and thus, the wavelength conversion efficiency of the excitation light decreases. Further, there is a problem that the necessary electrical power increases in addition to a decrease in life of the phosphor due to the heat.

Therefore, there has been demanded a configuration of the wavelength conversion device capable of increasing the cooling efficiency.

SUMMARY

A wavelength conversion device according to a first aspect of the present disclosure includes a rotating body having a disk-like shape, a wavelength converter having a plane of incidence and an exit surface, and disposed in a portion at circumferential edge side of the rotating body so as to form a ring-like shape centering on a rotational axis of the rotating body, excitation light entering the plane of incidence, the exit surface being arranged at an opposite side to the plane of incidence, and the exit surface emitting converted light obtained by performing a wavelength conversion on the excitation light, and a motor configured to rotate the rotating body, wherein the rotating body includes a vapor chamber, the vapor chamber includes a sealed container configured to contain a working fluid changing in phase between a vapor phase and a liquid phase, the sealed container includes a heat receiver which is arranged in an outer circumferential part of the sealed container, and which is configured to receive heat of the wavelength converter, and a heat dissipater which is arranged at the rotational axis side of the heat receiver, and which is configured to release the heat received by the heat receiver, the working fluid in the liquid phase is changed to the liquid phase due to the heat received by the heat receiver, and the working fluid in the vapor phase is condensed by the heat dissipater.

A light source device according to a second aspect of the present disclosure includes a light source configured to output excitation light, and the wavelength conversion device according to the first aspect described above configured to output converted light obtained by converting a wavelength of the excitation light.

A projector according to a third aspect of the present disclosure includes projecting modulated light obtained by modulating the light emitted from the light source device according to the second aspect described above.

DESCRIPTION OF EXEMPLARY EMBODIMENTS

First Embodiment

A first embodiment of the present disclosure will hereinafter be described based on the drawings.

Schematic Configuration of Projector

Figure 1:
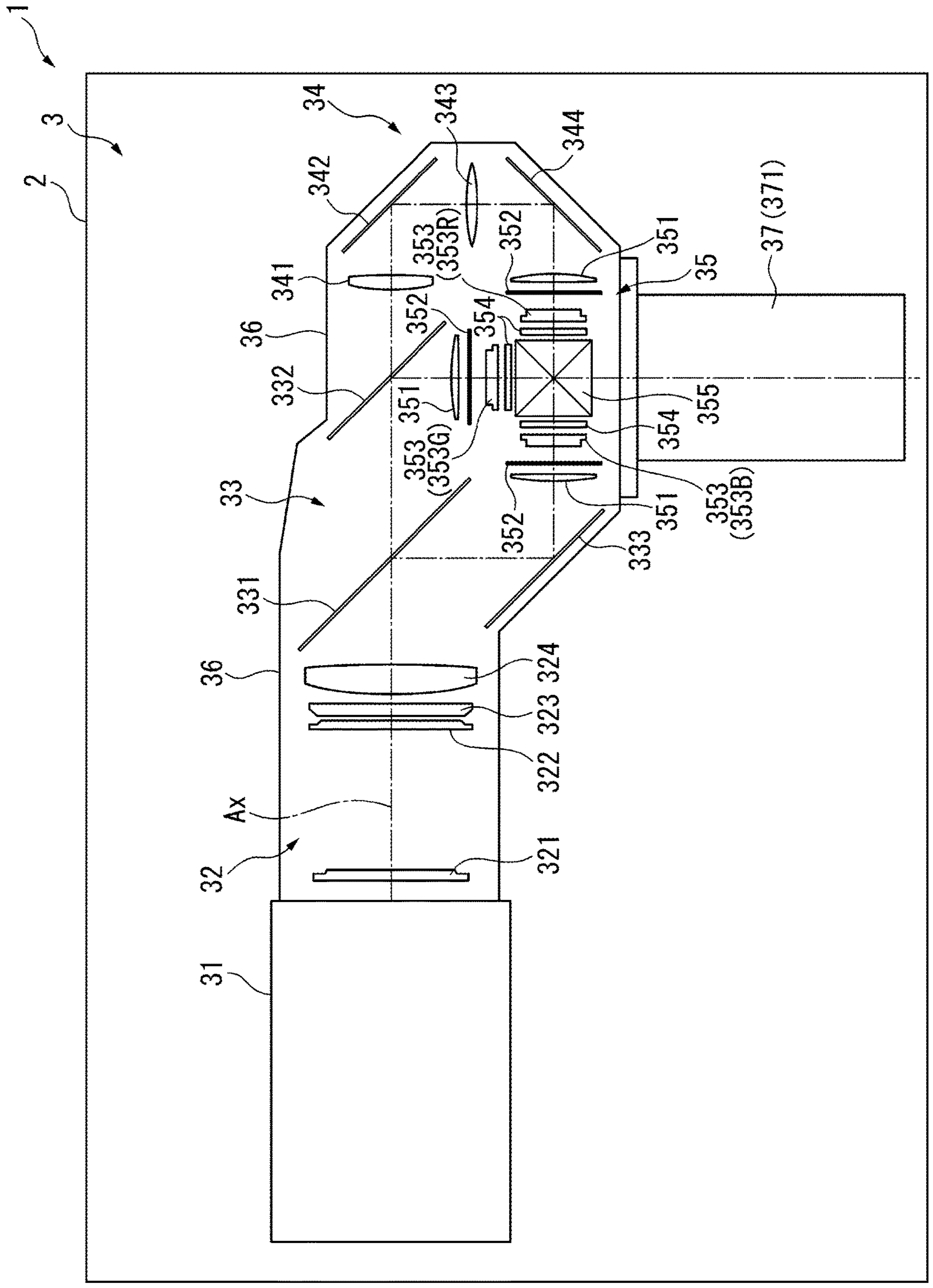
FIG. 1 is a schematic diagram showing a configuration of a projector according to a first embodiment.

FIG. 1 is a schematic diagram showing a configuration of a projector 1 according to the present embodiment.

The projector 1 according to the present embodiment is an image display device which modulates light having been emitted from a light source device 31 disposed inside to thereby from image light corresponding to image information, and then projects the image light thus formed on a projection target surface such as a screen in an enlarged manner. Although described later in detail, the projector 1 has one of the features in the configuration of a wavelength conversion device 4A provided to a first light source device 311 shown in FIG. 3.

As shown in FIG. 1, the projector 1 is provided with an exterior housing 2, and an image projection device 3 housed in the exterior housing 2. Besides the above, although not shown in the drawings, the projector 1 is provided with a control device for controlling operations of the projector 1, a power supply device for supplying electronic components constituting the projector 1 with electrical power, and a cooling device for cooling a cooling target constituting the projector 1.

Configuration of Image Projection Device

The image projection device 3 forms the image light corresponding to the image information input from the control device, and then projects the image light thus formed. The image projection device 3 is provided with the light source device 31, a homogenizing optical system 32, a color separation optical system 33, a relay optical system 34, an image forming device 35, an optical component housing 36, and a projection optical device 37.

The light source device 31 emits illumination light to the homogenizing optical system 32. A configuration of the light source device 31 will be described later in detail.

The homogenizing optical system 32 homogenizes the light emitted from the light source device 31. The light thus homogenized illuminates modulation areas of light modulation devices 353 described later via the color separation optical system 33 and the relay optical system 34. The homogenizing optical system 32 is provided with two lens arrays 321, 322, a polarization conversion element 323, and a superimposing lens 324.

The color separation optical system 33 separates the light having entered the color separation optical system 33 from the homogenizing optical system 32 into colored light beams of red, green, and blue. The color separation optical system 33 is provided with two dichroic mirrors 331, 332 and a reflecting mirror 333 for reflecting the blue light beam having been separated by the dichroic mirror 331.

The relay optical system 34 is disposed on a light path of the red light beam longer than light paths of other colored light beams to suppress a loss of the red light beam. The relay optical system 34 is provided with an incident side lens 341, a relay lens 343, and reflecting mirrors 342, 344. In the present embodiment, it is assumed that the red light beam is guided to the relay optical system 34. However, this is not a limitation, and it is also possible to adopt a configuration in which, for example, the colored light beam longer in light path than other colored light beams is set as the blue light beam, and the blue light beam is guided to the relay optical system 34.

The image forming device 35 modulates each of the colored light beams of red, green, and blue having entered the image forming device 35, and then combines the colored light beams thus modulated with each other to form the image light. The image forming device 35 has three field lenses 351, three incident side polarization plates 352, three light modulation devices 353, and three exit side polarization plates 354 disposed in accordance with the respective colored light beams entering the image forming device 35, and a single color combining optical system 355.

The light modulation devices 353 each modulate the light, which has been emitted from the light source device 31, based on an image signal input from the control device. Specifically, the light modulation devices 353 each modulate the colored light beam having entered from corresponding one of the incident side polarization plates 352 in accordance with the image signal input from the control device, and then emit the colored light beam thus modulated.

The three light modulation devices 353 include a light modulation device 353R for the red light beam, a light modulation device 353G for the green light beam, and a light modulation device 353B for the blue light beam. In the present embodiment, the light modulation devices 353 are each a transmissive liquid crystal panel, which emits the light thus modulated along an incident direction of the light, and a liquid crystal light valve is constituted by the incident side polarization plate 352, the light modulation device 353, and the exit side polarization plate 354.

The color combining optical system 355 combines the three colored light beams respectively modulated by the light modulation devices 353B, 353G, and 353R with each other to form the image light. The image light formed by the color combining optical system 355 enters the projection optical device 37. The color combining optical system 355 is formed of a cross dichroic prism having a substantially rectangular solid shape in the present embodiment, but can be constituted by a plurality of dichroic mirrors.

The homogenizing optical system 32, the color separation optical system 33, the relay optical system 34, and the image forming device 35, which are all described above, are housed inside the optical component housing 36. It should be noted that an illumination light axis Ax as a design optical axis is set in the image projection device 3, and the optical component housing 36 holds the homogenizing optical system 32, the color separation optical system 33, the relay optical system 34, and the image forming device 35 at predetermined positions on the illumination light axis Ax. The light source device 31 and the projection optical device 37 are disposed at predetermined positions on the illumination light axis Ax.

The projection optical device 37 projects the image light entering the projection optical device 37 from the image forming device 35 on the projection target surface such as a screen. The projection optical device 37 can be configured as a combination lens provided with, for example, a plurality of lenses not shown, and a lens tube 371 for housing the plurality of lenses.

Configuration of Light Source Device

Figure 2:
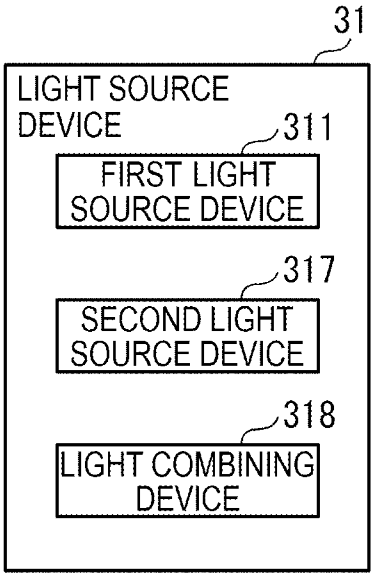
FIG. 2 is a block diagram showing a configuration of a light source device according to the first embodiment.

FIG. 2 is a block diagram showing a configuration of the light source device 31.

The light source device 31 emits illumination light for illuminating the light modulation devices 353 to the homogenizing optical system 32.

As shown in FIG. 2, the light source device 31 has the first light source device 311 for emitting the fluorescence as yellow light having a peak wavelength of, for example, 500 through 700 nm, a second light source device 317 for emitting the blue light beam, and the light combining device 318.

Out of these constituents, the light combining device 318 emits the illumination light to the homogenizing optical system 32, wherein the illumination light is obtained by combining the fluorescence emitted from the first light source device 311 and the blue light beam emitted from the second light source device 317 with each other.

Configuration of First Light Source Device

Figure 3:
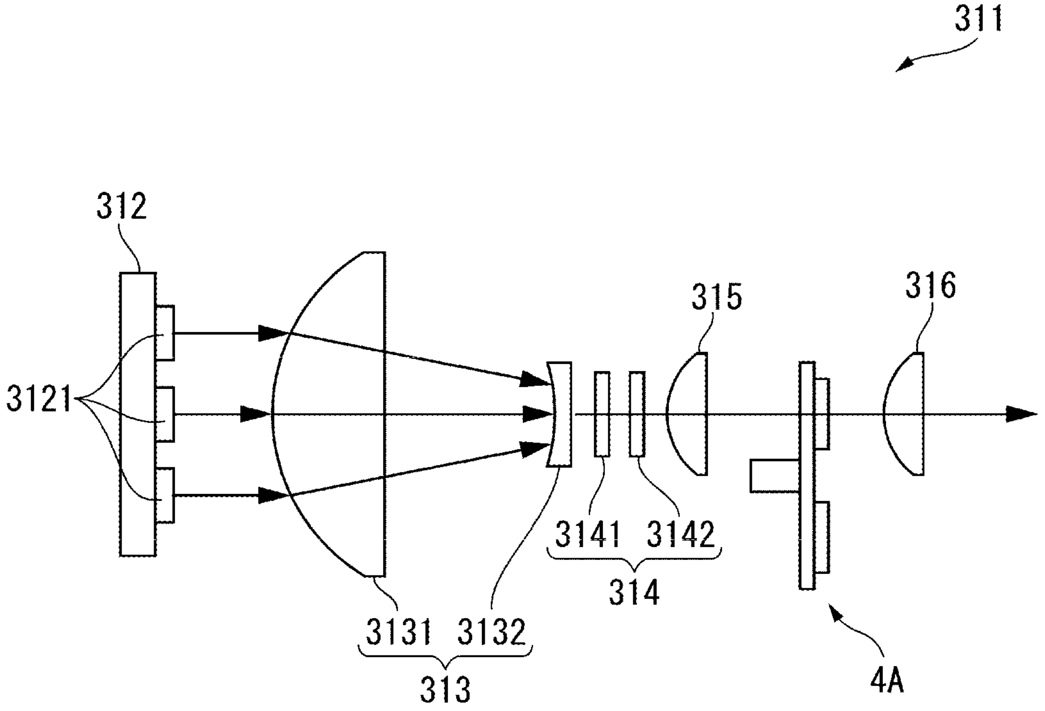
FIG. 3 is a schematic diagram showing a configuration of a first light source device according to the first embodiment.

FIG. 3 is a schematic diagram showing a configuration of the first light source device 311.

As shown in FIG. 3, the first light source device 311 is provided with a light source 312, an afocal optical element 313, a homogenizer optical element 314, a first light collection element 315, a wavelength conversion device 4A, and a second light collection element 316.

The light source 312 is provided with a plurality of solid-state light sources 3121 for emitting the excitation light. The solid-state light sources 3121 are each a light emitting element, and are each a semiconductor laser for emitting a blue laser beam having a peak wavelength of, for example, 440 nm or 460 nm, as the excitation light.

The afocal optical element 313 reduces the diameter of the excitation light emitted from the light source 312. The afocal optical element 313 is constituted by a lens 3131 for collecting the incident light, and a lens 3132 for collimating the light beam collected by the lens 3131.

The homogenizer optical element 314 homogenizes the illuminance distribution of the excitation light thus reduced in diameter by the afocal optical element 313. The homogenizer optical element 314 is formed of a pair of multi-lens arrays 3141, 3142. The first light source device 311 can adopt a diffuse transmission element, which diffuses the incident light in the process of transmitting the incident light, instead of the homogenizer optical element 314.

The first light collection element 315 converges the excitation light having passed through the homogenizer optical element 314 on a wavelength converter 6 of the wavelength conversion device 4A.

The wavelength conversion device 4A emits the converted light obtained by converting the wavelength of the excitation light having entered the wavelength conversion device 4A to the second light collection element 316. Specifically, the wavelength conversion device 4A emits the converted light having a wavelength longer than the wavelength of the excitation light to the second light collection element 316. The wavelength conversion device 4A is a transmissive wavelength conversion device for emitting the converted light along the incident direction of the excitation light to the wavelength conversion device 4A. It should be noted that the converted light is the fluorescence having the peak wavelength of 500 through 700 nm as described above. The configuration of the wavelength conversion device 4A will be described later in detail.

The second light collection element 316 converges and collimates the converted light emitted from the wavelength conversion device 4A, and then emits the result to the light combining device 318. In other words, the second light collection element 316 is a collecting lens.

The converted light having entered the light combining device 318 from the first light source device 311 is combined with the blue light beam emitted from the second light source device 317 in the light combining device 318, and then enters the homogenizing optical system 32.

Detailed Configuration of Wavelength Conversion Device

Figure 4:
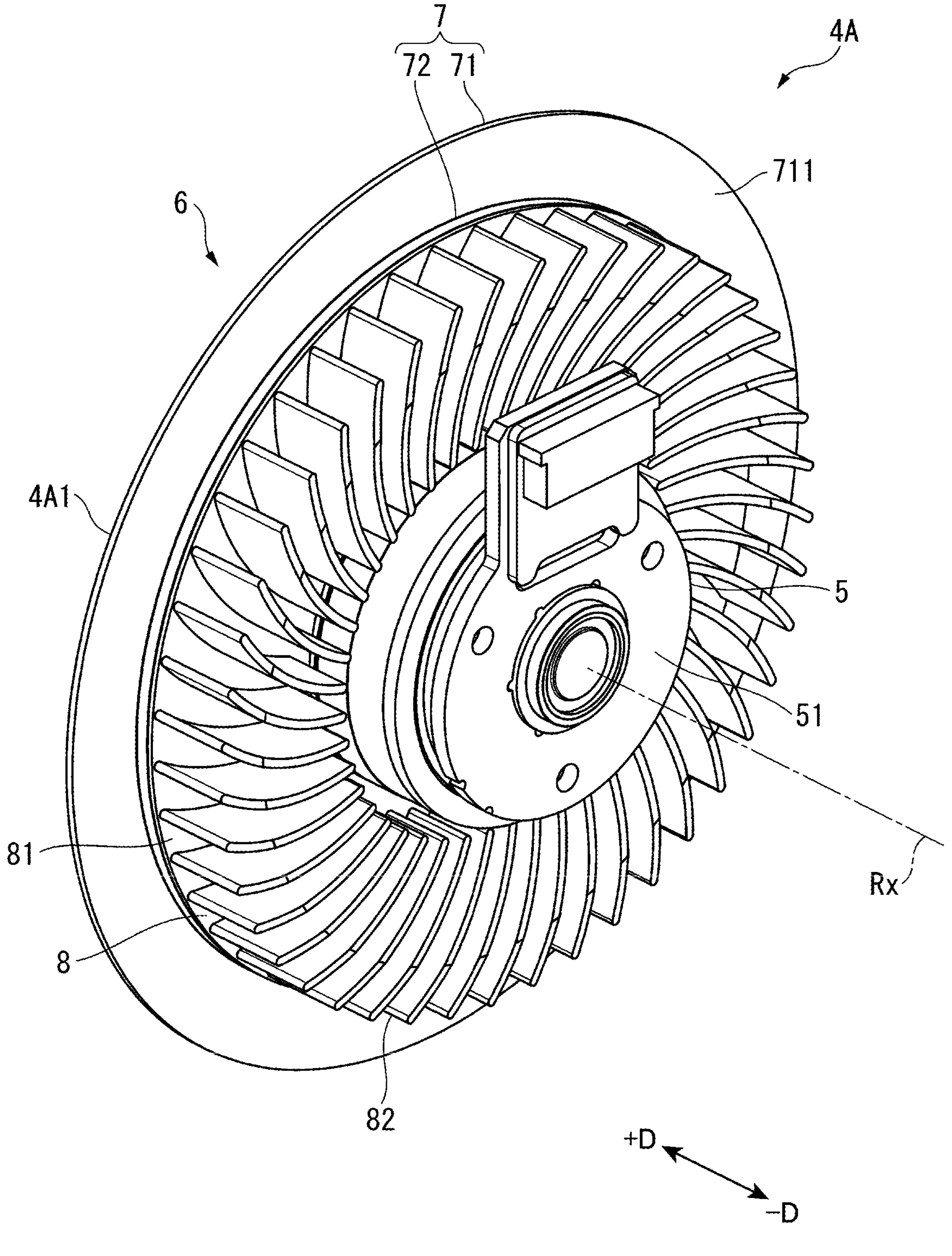
FIG. 4 is a perspective view showing a wavelength conversion device according to the first embodiment.
Figure 5:
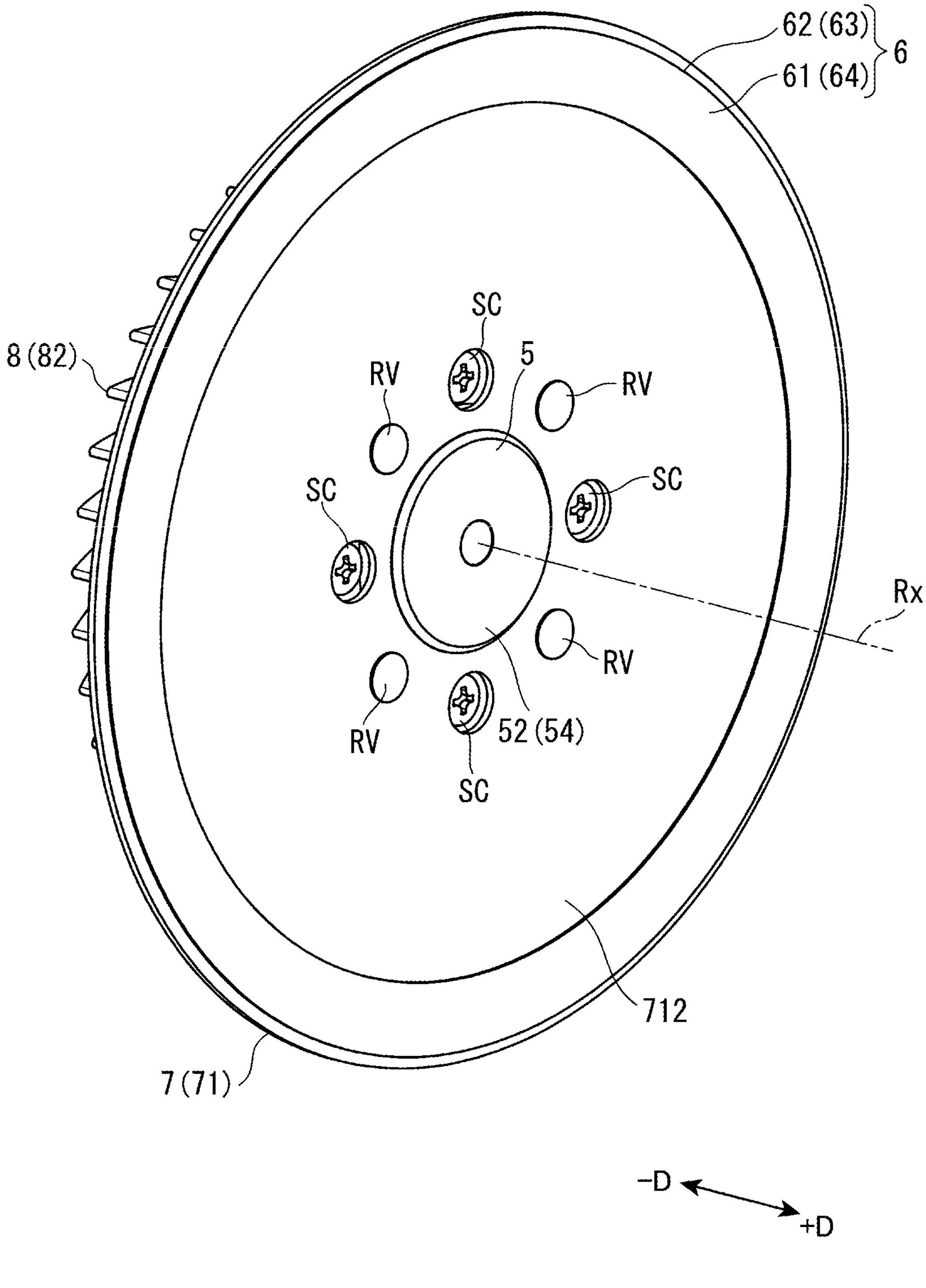
FIG. 5 is a perspective view showing the wavelength conversion device according to the first embodiment.
Figure 6:
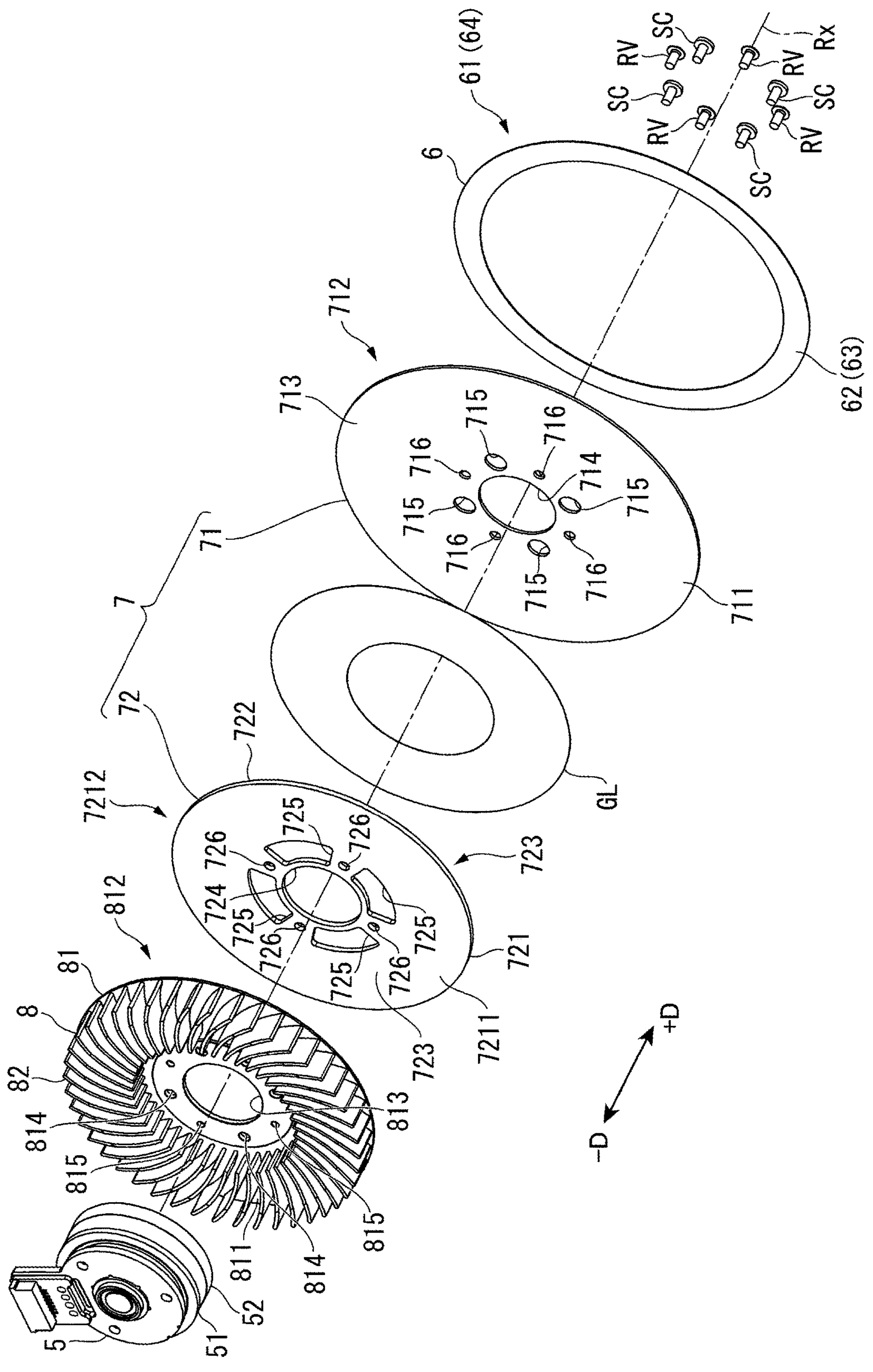
FIG. 6 is an exploded perspective view showing the wavelength conversion device according to the first embodiment.
Figure 7:
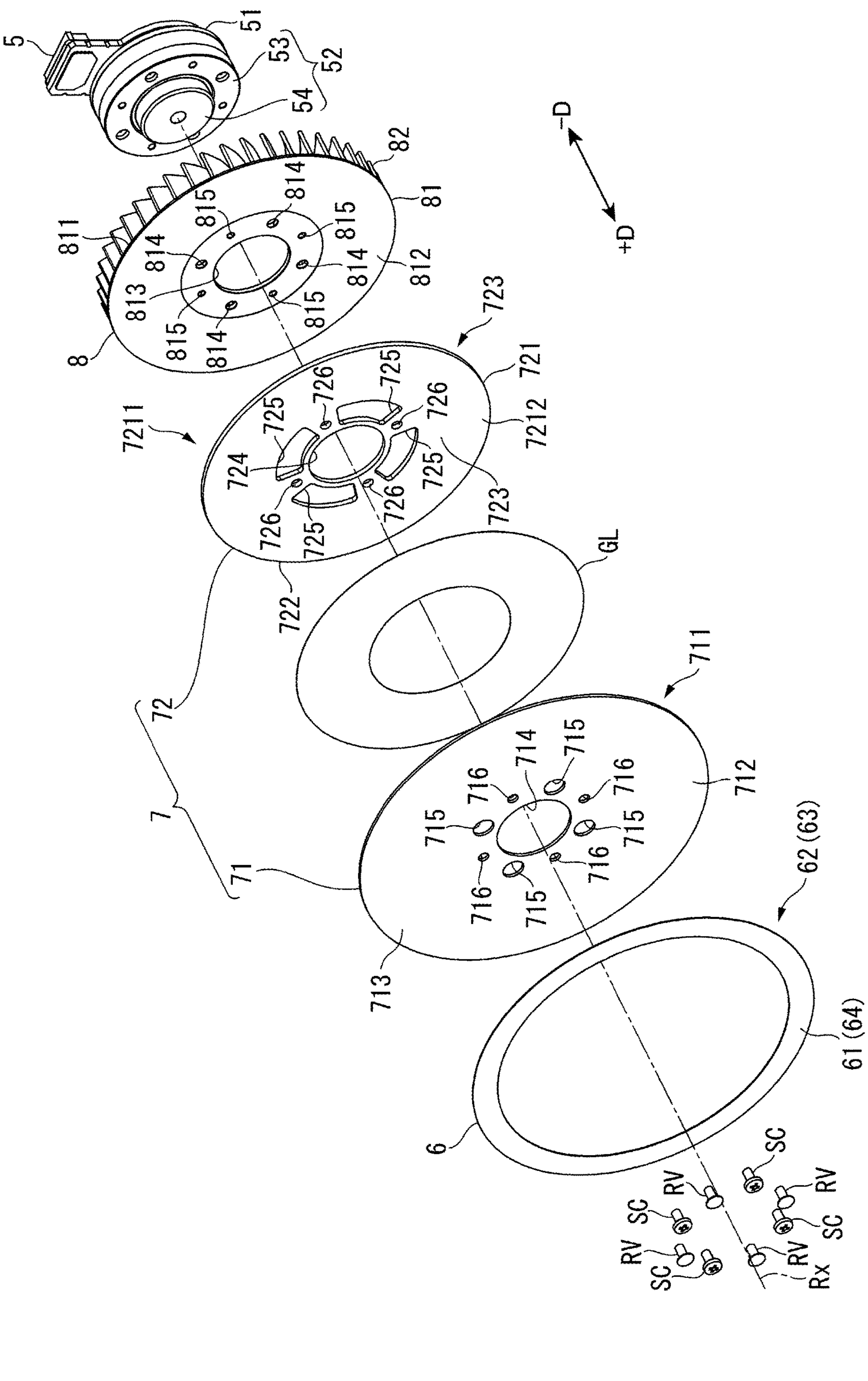
FIG. 7 is an exploded perspective view showing the wavelength conversion device according to the first embodiment.

FIG. 4 and FIG. 5 are each a perspective view showing the wavelength conversion device 4A, and FIG. 6 and FIG. 7 are each an exploded perspective view showing the wavelength conversion device 4A. FIG. 4 and FIG. 6 are each a diagram of the wavelength conversion device 4A viewed from the incident side of the excitation light. FIG. 5 and FIG. 7 are each a diagram of the wavelength conversion device 4A viewed from an opposite side to the incident side of the excitation light. In other words, FIG. 5 and FIG. 7 are each a diagram of the wavelength conversion device 4A viewed from the exit side of the excitation light.

The wavelength conversion device 4A is provided with a motor 5, the wavelength converter 6, a rotating body 7, and a radiator fin 8. The wavelength converter 6 and the rotating body 7 constitute a wavelength conversion element 4A1 which is rotated by the motor 5 centering on a rotational axis Rx. In other words, the wavelength conversion device 4A is provided with the motor 5, and the wavelength conversion element 4A1 rotated by the motor 5.

In the following description, the incident direction of the excitation light to the wavelength conversion device 4A is defined as a +D direction, and an opposite direction to the +D direction is defined as a −D direction. The +D direction and the −D direction are directions parallel to the rotational axis Rx.

Configuration of Motor

The motor 5 rotates the rotating body 7 centering on the rotational axis Rx, and by extension, rotates the wavelength converter 6 arranged on the rotating body 7. The motor 5 is arranged at a position crossing the rotational axis Rx of the rotating body 7. In other words, the motor 5 is arranged on the rotational axis Rx of the rotating body 7. The motor 5 is arranged at the incident side of the excitation light with respect to the rotating body 7, and is integrated with the rotating body 7. In the present embodiment, the motor 5 is arranged at the incident side of the excitation light with respect to a substrate 71.

As shown in FIG. 7, the motor 5 is provided with a driver 51 and a rotor 52.

The driver 51 rotates the rotor 52.

The rotor 52 is arranged at the +D direction side of the driver 51, and is rotated by the driver 51. The rotor 52 has a fixation part 53 and an insertion part 54.

The fixation part 53 is a portion to which screws SC penetrating the rotating body 7 and the radiator fin 8 from the −D direction side are fixed. In other words, the rotating body 7 and the radiator fin 8 are fixed to the fixation part 53. The insertion part 54 is a protruding part cylindrically protruding toward the +D direction from a portion crossing the rotational axis Rx in the fixation part 53. The insertion part 54 penetrates a through opening 813 of the radiator fin 8 and through openings 714, 724 of the rotating body 7 toward the +D direction.

Configuration of Wavelength Converter

The wavelength converter 6 emits the converted light obtained by converting the wavelength of the excitation light entering the wavelength converter 6. The wavelength converter 6 has a phosphor layer 61 and a reflecting layer 62.

The phosphor layer 61 includes a phosphor which is excited by the excitation light entering the phosphor layer 61 to emit the fluorescence, which has a wavelength longer than the wavelength of the excitation light, as the converted light.

The reflecting layer 62 is arranged at the incident side of the excitation light with respect to the phosphor layer 61. The reflecting layer 62 transmits the excitation light, and reflects the converted light having the wavelength longer than the wavelength of the excitation light. The reflecting layer 62 is formed by stacking, for example, a plurality of dielectric films.

Such a wavelength converter 6 has a plane of incidence 63 and an exit surface 64.

The plane of incidence 63 is a surface facing to the −D direction in the wavelength converter 6, and is formed of the reflecting layer 62. The excitation light enters the plane of incidence 63 along the +D direction.

The exit surface 64 is a surface facing to the +D direction in the wavelength converter 6, and is formed of the phosphor layer 61. In other words, the exit surface 64 is a surface at an opposite side to the plane of incidence 63 in the wavelength converter 6. The converted light generated by the phosphor layer 61 is emitted from the exit surface 64.

Such a wavelength converter 6 is disposed in a portion at a rim side of the substrate 71 constituting the rotating body 7 so as to form a ring-like shape centering on the rotational axis Rx. In a detailed description, the wavelength converter 6 is disposed on a surface 712 facing to the +D direction in the substrate 71, and the plane of incidence 63 and the surface 712 are opposed to each other.

Configuration of Rotating Body

The rotating body 7 is rotated by the motor 5. As shown in FIG. 6 and FIG. 7, the rotating body 7 has the substrate 71 and a vapor chamber 72.

Configuration of Substrate

The substrate 71 is a disk-like substrate having a light transmissive property. In a detailed description, the substrate 71 is a light-transmissive substrate having a disk-like shape centering on the rotational axis Rx. In the present embodiment, the substrate 71 is formed of glass.

In the substrate 71, to a surface 711 facing to the −D direction, there is attached the vapor chamber 72 with an adhesive GL.

In the substrate 71, to a portion at the outer circumferential side on the surface 712 facing to the +D direction, there is fixed the wavelength converter 6. As described above, since the substrate 71 is the light-transmissive substrate, an area where the excitation light entering the wavelength converter 6 is transmitted in the substrate 71 is a light transmission area 713 through which light is transmitted. In other words, the substrate 71 has the light transmission area 713 through which the excitation light entering the wavelength converter 6 is transmitted, and the wavelength converter 6 is arranged in accordance with the light transmission area 713 in the substrate 71.

The substrate 71 has a through opening 714, which penetrates the substrate 71 along the rotational axis Rx, in a portion crossing the rotational axis Rx. The through opening 714 is formed to have a circular shape viewed from the +D direction side, and the insertion part 54 is inserted into the through opening 714 along the +D direction.

The substrate 71 has a plurality of holes 715 and a plurality of holes 716 disposed on the periphery of the through opening 714 viewed from the +D direction side. The holes 715 are each a hole larger in inner diameter than the holes 716, and the holes 715 and the holes 716 are alternately arranged along a circumferential direction centering on the rotational axis Rx. A screw SC is inserted into each of the holes 715 along the −D direction, and a rivet RV is inserted into each of the holes 716 along the −D direction.

Configuration of Vapor Chamber

The vapor chamber 72 is a heat transporter for transporting heat, and is arranged at an incident side of the excitation light with respect to the substrate 71 in the present embodiment. As shown in FIG. 6 and FIG. 7, the vapor chamber 72 is formed to have a ring-like shape smaller in outer diameter than the substrate 71. In other words, the outer circumferential edge of the vapor chamber 72 is arranged at the rotational axis Rx side of an incident area which the excitation light enters in the wavelength converter 6. In a detailed description, the outer circumferential edge of the vapor chamber 72 is arranged at the rotational axis Rx side of an inner edge of the wavelength converter 6. In other words, the vapor chamber 72 is arranged at the rotational axis Rx side of the wavelength converter 6.

The vapor chamber 72 has a sealed container 721, and the sealed container 721 houses a working fluid capable of changing in phase between a vapor phase and a liquid phase. The sealed container 721 has a surface 7211 at the −D direction side and a surface 7212 at the +D direction side. The surface 7211 faces to the −D direction, and the surface 7212 faces to the +D direction.

In the sealed container 721, a portion to which the heat is transferred from the outside becomes a heat receiver 722, and a portion which is capable of releasing the heat received by the heat receiver 722 becomes a heat dissipater 723. In the present embodiment, a portion at the outer circumferential side in the sealed container 721 becomes the heat receiver 722, and the heat receiver 722 receives the heat from the wavelength converter 6 via the substrate 71. Specifically, the heat receiver 722 is disposed at a position closer to the rotational axis Rx of the substrate 71 than the wavelength converter 6.

Further, in the sealed container 721, a portion closer to the rotational axis Rx than the heat receiver 722 becomes the heat dissipater 723, and the heat dissipater 723 releases the heat to the outside. Specifically, in the present embodiment, the heat dissipater 723 is arranged on the surface 7211, and a portion at the rotational axis Rx side of the surface 7212.

Similarly to the substrate 71, the vapor chamber 72 has the through opening 724 penetrating the vapor chamber 72 along the rotational axis Rx. The through opening 724 is formed in a portion crossing the rotational axis Rx to have a circular shape viewed from the +D direction side, and the insertion part 54 is inserted into the through opening 724 along the +D direction.

The vapor chamber 72 has a plurality of holes 725 and a plurality of holes 726 disposed on the periphery of the through opening 724 viewed from the +D direction side. The holes 725 are each a hole larger in inner diameter than the holes 726, and the holes 725 and the holes 726 are alternately arranged along a circumferential direction centering on the rotational axis Rx. A screw SC is inserted into each of the holes 725 along the −D direction, and a rivet RV is inserted into each of the holes 726 along the −D direction.

Configuration of Radiator Fin

The radiator fin 8 is coupled to the rotating body 7 so as to be able to transfer heat, and releases the heat of the wavelength converter 6 transferred from the rotating body 7. The radiator fin 8 has a base part 81 and a plurality of fins 82.

Configuration of Base Part

The base part 81 is formed to have a disk-like shape centering on the rotational axis Rx. On a surface 811 at the −D direction side in the base part 81, there is disposed the plurality of fins 82. A surface 812 at the +D direction side in the base part 81 is coupled to the surface 7211 of the vapor chamber 72. Thus, to the base part 81, there is transferred the heat of the wavelength converter 6 from the vapor chamber 72.

The base part 81 has a through opening 813, which penetrates the base part 81 along the +D direction, at a position crossing the rotational axis Rx. The insertion part 54 is inserted into the through opening 813 along the +D direction. Further, on the periphery of the through opening 813, there is disposed a plurality of holes 814, 815 similar to the plurality of holes 715, 716. The screws SC having penetrated the holes 725 of the vapor chamber 72 are inserted through the holes 814 along the −D direction. The rivets RV having penetrated the holes 726 of the vapor chamber 72 are inserted through the holes 815 along the −D direction. Further, by the screws SC and the rivets RV being fixed to the fixation part 53 of the motor 5, the rotating body 7 to which the wavelength converter 6 is fixed and the radiator fin 8 are integrated with the motor 5.

Configuration of Fins

The plurality of fins 82 is disposed on the surface 811 of the base part 81 along the circumferential direction centering on the rotational axis Rx. Each of the fins 82 rises from the surface 812 toward the −d direction, and is formed to have a circular-arc shape extending from the outer edge side toward the center of the base part 81 when viewed from the −D direction side. To the plurality of fins 82, there is transferred the heat from the base part 81.

When such a radiator fin 8 is rotated by the motor 5, the air around the radiator fin 8 flows outward in the radial direction centering on the rotational axis Rx from an area at the rotational axis Rx side. In other words, when the radiator fin 8 is rotated, the air flow toward the outer side in the radial direction centering on the rotational axis Rx flows between the fins 82. By the heat transferred to the plurality of fins 82 being transferred to the airflow, a part of the heat having transferred from the wavelength converter 6 is released.

Heat Transfer in Wavelength Conversion Device

Figure 8:
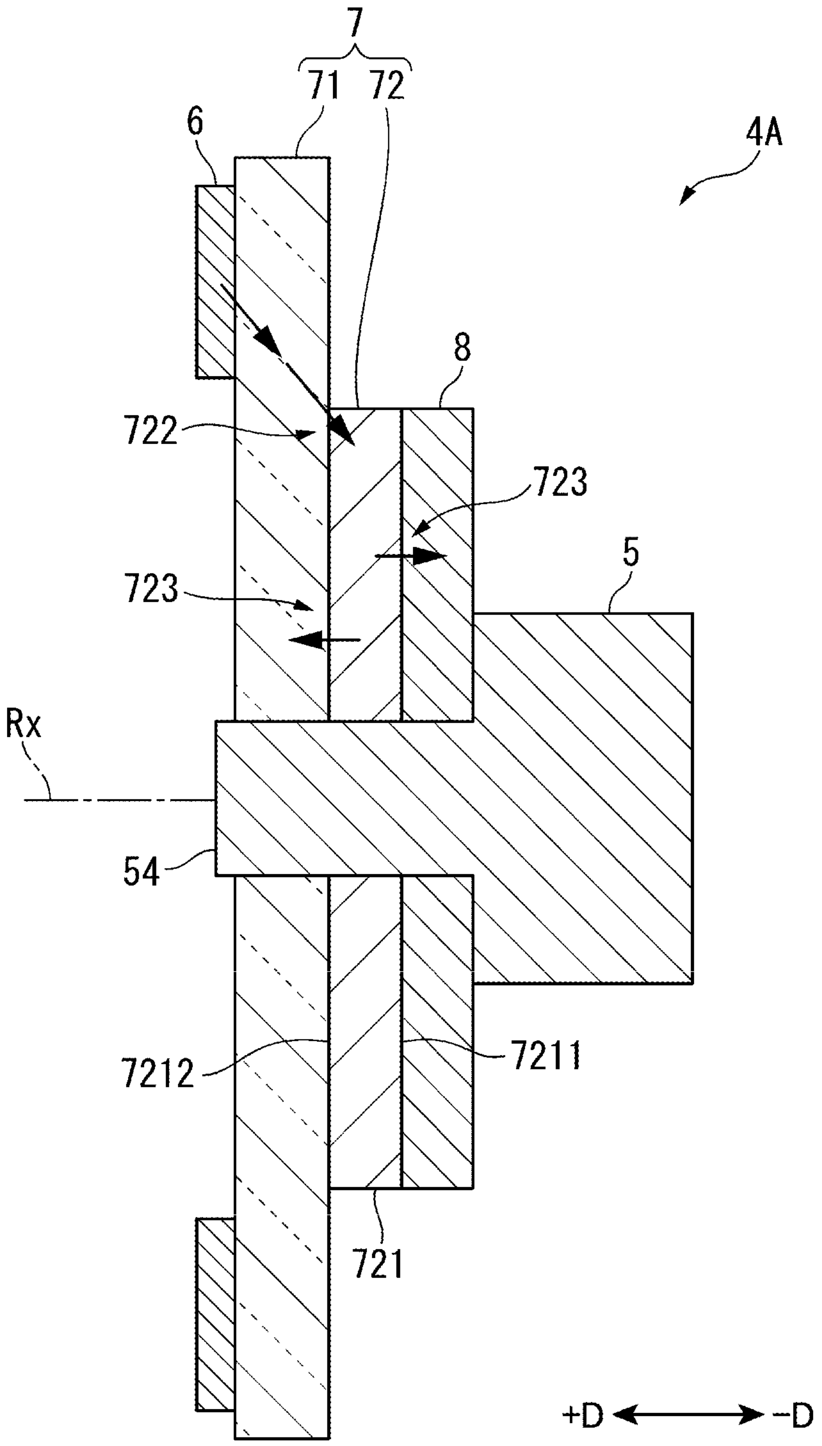
FIG. 8 is a cross-sectional view showing the wavelength conversion device according to the first embodiment.

FIG. 8 is a cross-sectional view showing the wavelength conversion device 4A in a direction along the rotational axis Rx. In other words, FIG. 8 is a diagram for explaining a heat transfer path in the wavelength conversion device 4A.

In the wavelength conversion device 4A described above, by the excitation light entering the wavelength converter 6, the wavelength converter 6 generates heat. The heat generated in the wavelength converter 6 is transferred to the substrate 71, and the heat having transferred to the substrate 71 is received by the heat receiver 722 of the vapor chamber 72.

Due to the heat having been transferred to the heat receiver 722, the working fluid in the liquid phase changes to the working fluid in the vapor phase on an inner surface corresponding to the heat receiver 722 out of the inner surface of the sealed container 721. The working fluid in the vapor phase diffuses inside the sealed container 721, and a part of the working fluid in the vapor phase reaches the heat dissipater 723.

The working fluid in the vapor phase having reached the heat dissipater 723 transfers the heat to the inner surface of the heat dissipater 723 to thereby be condensed, and change to the working fluid in the liquid phase. The working fluid in the liquid phase reaches the heat receiver 722 along a mesh not shown disposed on the inner surface of the sealed container 721, and then changes again to the working fluid in the vapor phase due to the heat transferred to the heat receiver 722. The working fluid in the liquid phase is apt to move to the heat receiver 722 located at the circumferential edge side in the sealed container 721 due to a centrifugal force generated in the vapor chamber 72 rotated by the motor 5.

In contrast, out of the heat dissipater 723 to which the heat is transferred from the working fluid in the vapor phase, the heat dissipater 723 disposed in a portion at the rotational axis Rx side on the surface 7212 at the +D direction side in the sealed container 721 transfers the heat to a portion at the rotational axis Rx side in the substrate 71. Thus, it is possible to make use of the portion at the rotational axis Rx side of the wavelength converter 6 in the substrate 71 as a heat dissipation surface.

Further, out of the heat dissipater 723 to which the heat is transferred from the working fluid in the vapor phase, the heat dissipater 723 disposed on the surface 7211 at the −D direction side in the sealed container 721 transfers the heat to the radiator fin 8. Thus, it is possible to release a part of the heat transferred from the wavelength converter 6 with the radiator fin 8.

Therefore, it is possible to enlarge the radiation area of the heat transferred from the wavelength converter 6, and in addition, the heat which is transferred from the wavelength converter 6 can promptly be transferred to the substrate 71 and the radiator fin 8 by the vapor chamber 72. Therefore, it is possible to increase the radiation efficiency of the heat generated in the wavelength converter 6, and by extension, it is possible to increase the cooling efficiency of the wavelength converter 6. Further, thus, it is possible to prevent the wavelength conversion efficiency of the wavelength converter 6 from decreasing even when increasing the intensity of the excitation light entering the wavelength converter 6, and in addition, it is possible to achieve increase in product life of the wavelength conversion device 4A.

Advantages of First Embodiment

The projector 1 according to the present embodiment described hereinabove exerts the following advantages.

The projector 1 projects the modulated light obtained by modulating the light emitted from the light source device 31.

The light source device 31 is provided with the light source 312 for outputting the excitation light and the wavelength conversion device 4A for outputting the converted light obtained by converting the wavelength of the excitation light.

The wavelength conversion device 4A is provided with the motor 5, the wavelength converter 6, and the rotating body 7 having a disk-like shape.

The motor 5 rotates the rotating body 7. The wavelength converter 6 has the plane of incidence 63 which the excitation light enters, and the exit surface 64 which is arranged at an opposite side to the plane of incidence 63, and which emits the converted light obtained by performing the wavelength conversion on the excitation light. The wavelength converter 6 is disposed in a portion at the circumferential edge side of the rotating body 7 so as to have a ring-like shape centering on the rotational axis Rx of the rotating body 7.

The rotating body 7 is provided with the vapor chamber 72. The vapor chamber 72 is provided with the sealed container 721 for housing the working fluid which changes in phase between the vapor phase and the liquid phase. The sealed container 721 has the heat receiver 722 and the heat dissipater 723.

The heat receiver 722 is arranged in an outer circumferential portion of the sealed container 721, and receives the heat of the wavelength converter 6.

The heat dissipater 723 is arranged at the rotational axis Rx side of the heat receiver 722, and releases the heat having been received by the heat receiver 722.

Out of the working fluid housed inside the sealed container 721, the working fluid in the liquid phase is changed to the vapor phase by the heat having been received by the heat receiver 722, and the working fluid in the vapor phase is condensed by the heat dissipater 723.

According to such a configuration, by making the excitation light enter the plane of incidence 63 of the wavelength converter 6, it is possible to emit the converted light obtained by performing the wavelength conversion on the excitation light from the exit surface 64.

Further, when the heat generated by the wavelength converter 6 having a ring-like shape disposed in a portion at the circumferential edge side of the rotating body 7 is received by the heat receiver 722 of the vapor chamber 72, the working fluid in the liquid phase located inside the sealed container 721 changes to the vapor phase in the heat receiver 722 due to the heat thus received. The working fluid having changed to the vapor phase rapidly diffuses inside the sealed container 721. Thus, the heat diffuses inside the entire sealed container 721. Out of the working fluid in the vapor phase diffused inside the sealed container 721, a part of the working fluid in the vapor phase reaches the heat dissipater 723 arranged at the rotational axis Rx side of the heat receiver 722, then transfers the heat to the heat dissipater 723 to thereby be condensed, and changes to the working fluid in the liquid phase. Meanwhile, the heat dissipater 723 is cooled by the ambient air surrounding the rotating body 7. By such a heat transfer cycle being repeated inside the vapor chamber 72, the rise in temperature of the wavelength converter 6 is suppressed.

Thus, even when increasing the intensity of the excitation light entering the wavelength converter 6, it is possible to suppress the rise in temperature of the wavelength converter 6. This makes it possible to prevent the wavelength conversion efficiency of the excitation light by the wavelength converter 6 from decreasing, and in addition, this makes it possible to prevent the life of the wavelength converter 6 from shortening. Therefore, even when increasing the intensity of the excitation light entering the wavelength converter 6, and increasing an exit amount of the converted light, it is possible to prevent the deterioration of the wavelength converter 6, and thus, it is possible to increase the wavelength conversion efficiency of the excitation light.

Further, when the rotating body 7 rotates centering on the rotational axis Rx, the working fluid in the liquid phase is apt to be moved toward the circumferential edge in the sealed container 721 due to the centrifugal force. In contrast, since the heat receiver 722 for receiving the heat of the wavelength converter 6 is arranged in the outer circumferential portion of the sealed container 721, it is possible to make it easy to move the working fluid in the liquid phase to the heat receiver 722. Therefore, since it is possible to promote the evaporation of the working fluid in the liquid phase due to the heat transferred from the wavelength converter 6, it is possible to increase the cooling efficiency of the wavelength converter 6.

Further, thus, since it is possible to make the light source device 3 stably operate while increasing the intensity of the light emitted from the light source device 31, it is possible for the projector 1 to stably project the image light increased in luminance.

In the wavelength conversion device 4A, the rotating body 7 is provided with the substrate 71 having a disk-like shape. The wavelength converter 6 is arranged at the circumferential edge side of the substrate 71 in the substrate 71. The heat receiver 722 is disposed at a position closer to the rotational axis Rx of the substrate 71 than the wavelength converter 6.

According to such a configuration, since the wavelength converter 6 is arranged at the circumferential edge side of the substrate 71, it is possible to increase the length in the circumferential direction centering on the rotational axis Rx in the wavelength converter 6 compared to when arranging the wavelength converter 6 at the rotational axis Rx side. Thus, since it is possible to spread the portions which generate heat due to the excitation light entering the wavelength converter 6 in the wavelength converter 6, it is possible to suppress the rise in temperature of the wavelength converter 6.

Further, the heat generated in the wavelength converter 6 is received by the heat receiver 722 arranged at the rotational axis Rx side of the wavelength converter 6. As described above, the heat received by the heat receiver 722 is released in the heat dissipater 723 arranged at the rotational axis Rx side. Since the wavelength converter 6 is arranged at the circumferential edge side of the substrate 71, it is possible to enlarge the area of a portion which is located at the rotational axis Rx side, and in which the heat dissipater 723 is arranged, and it is possible to enlarge the radiation area of the heat transferred from the wavelength converter 6. Therefore, since it is possible to increase the cooling efficiency of the wavelength converter 6, it is possible to prevent the deterioration of the wavelength converter 6, and in addition, it is possible to increase the wavelength conversion efficiency of the excitation light by the wavelength converter 6.

In the wavelength conversion device 4A, the motor 5 is arranged at the incident side of the excitation light with respect to the substrate 71. The vapor chamber 72 is arranged at the incident side of the excitation light with respect to the substrate 71.

According to such a configuration, it is possible to transfer the heat generated in the motor 5 to the vapor chamber 72. Therefore, it is possible to increase the cooling efficiency of the motor 5.

In the wavelength conversion device 4A, the vapor chamber 72 has the through opening 724 penetrating the vapor chamber 72 along the rotational axis Rx. In the motor 5, the insertion part 54 is coupled to the substrate 71 through the through opening 724.

According to such a configuration, it is possible to make the vapor chamber 72 closer to the heat generation portion in the motor 5. Therefore, it is possible to make it easy to transfer the heat to the vapor chamber 72 from the motor 5, and therefore, it is possible to increase the cooling efficiency of the motor 5.

In the wavelength conversion device 4A, the substrate 71 has the light transmission area 713 through which the light is transmitted. The wavelength converter 6 is arranged in accordance with the light transmission area 713 in the substrate 71. The vapor chamber 72 is disposed at the rotational axis Rx side of the wavelength converter 6.

According to such a configuration, it is possible to make the excitation light enter the wavelength converter via the light transmission area, and in addition, it is possible to prevent the vapor chamber 72 from blocking the excitation light and the converted light.

In the wavelength conversion device 4A, the substrate 71 has a light-transmissive property. The excitation light enters the wavelength converter 6 via the rotating body 7.

According to such a configuration, since the whole of the substrate 71 transmits the light, it is not necessary to make the wavelength converter 6 project toward the outer side in the radial direction centering on the rotational axis Rx than the rotating body 7 in order to make the excitation light enter the wavelength converter 6 and in order to emit the converted light. Therefore, it is possible to achieve reduction in size of the wavelength conversion device 4A in the radial direction centering on the rotational axis Rx.

Further, it results in that the wavelength converter 6 is arranged at an opposite side to the incident side of the excitation light with respect to the rotating body 7. This makes it possible to shorten the distance between the second light collection element 316 as the collecting lens located in the posterior stage of the wavelength conversion device 4A and the wavelength converter 6. Therefore, it is possible to make it easy for the second light collection element 316 to collect the converted light emitted from the wavelength converter 6.

The wavelength conversion device 4A is provided with the radiator fin 8 for releasing the heat transferred from the vapor chamber 72.

According to such a configuration, it is possible to enlarge the radiation area for the heat transferred from the vapor chamber 72 using the radiator fin 8. In other words, it is possible to enlarge the radiation area for the heat transferred from the wavelength converter 6. Therefore, it is possible to increase the cooling efficiency of the wavelength converter 6.

First Modified Example of First Embodiment

Figure 9:
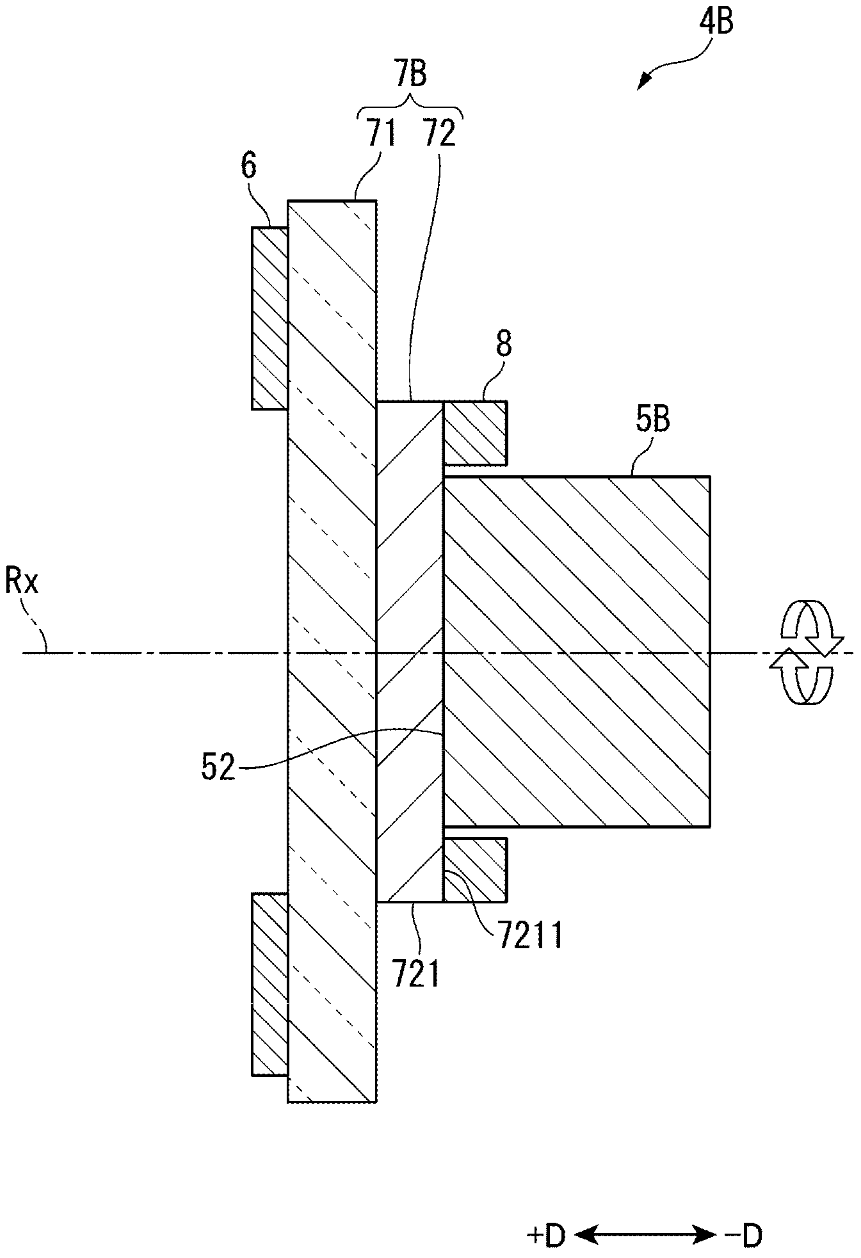
FIG. 9 is a schematic diagram showing a first modified example of the wavelength conversion device according to the first embodiment.

FIG. 9 is a schematic diagram showing a wavelength conversion device 4B according to a first modified example of the wavelength conversion device 4A.

In the wavelength conversion device 4A described above, the motor 5 is integrated with the radiator fin 8 and the rotating body 7 with the insertion part 54 inserted into the radiator fin 8 and the rotating body 7 in the +D direction. However, this is not a limitation, and the rotor 52 of the motor 5 can be coupled to the surface 7211 at the −D direction side in the sealed container 721 of the vapor chamber 72.

For example, it is possible to adopt the wavelength conversion device 4B shown in FIG. 9 instead of the wavelength conversion device 4A.

The wavelength conversion device 4B is provided with substantially the same configuration and substantially the same functions as those of the wavelength conversion device 4A except the point that the wavelength conversion device 4B is provided with a motor 5B and a rotating body 7B instead of the motor 5 and the rotating body 7. In other words, the wavelength conversion device 4B is provided with the motor 5B, the wavelength converter 6, the rotating body 7B, and the radiator fin 8.

Similarly to the motor 5, the motor 5B is provided with the driver 51 and the rotor 52. However, in the wavelength conversion device 4B, the rotor 52 is not provided with the insertion part 54.

Similarly to the rotating body 7, the rotating body 7B is provided with the substrate 71 and the vapor chamber 72. However, in the wavelength conversion device 4B, the substrate 71 is not provided with the through opening 714 or holes 715, 716, and the vapor chamber 72 is not provided with the through opening 724 or the holes 725, 726.

Further, the rotor 52 of the motor 5B is fixed to the surface 7211 at the −D direction side in the sealed container 721 of the vapor chamber 72 with a fixture such as a screw, or with an adhesive. In a detailed description, the rotor 52 of the motor 5B is coupled to a portion crossing the rotational axis Rx on the surface 7211 of the vapor chamber 72. In this case, the radiator fin 8 can be fixed to the vapor chamber 72 with a fixture, or can be fixed with an adhesive.

Such a wavelength conversion device 4B exerts the following advantages in addition to substantially the same advantages as those of the wavelength conversion device 4A.

In the wavelength conversion device 4B, the motor 5B is coupled to the vapor chamber 72.

According to such a configuration, it is possible to prevent the radiation area of the vapor chamber 72 from decreasing compared to the configuration in which the motor 5B penetrates the vapor chamber 72. Therefore, it is possible to increase the cooling efficiency of the wavelength converter 6.

Second Modified Example of First Embodiment

Figure 10:
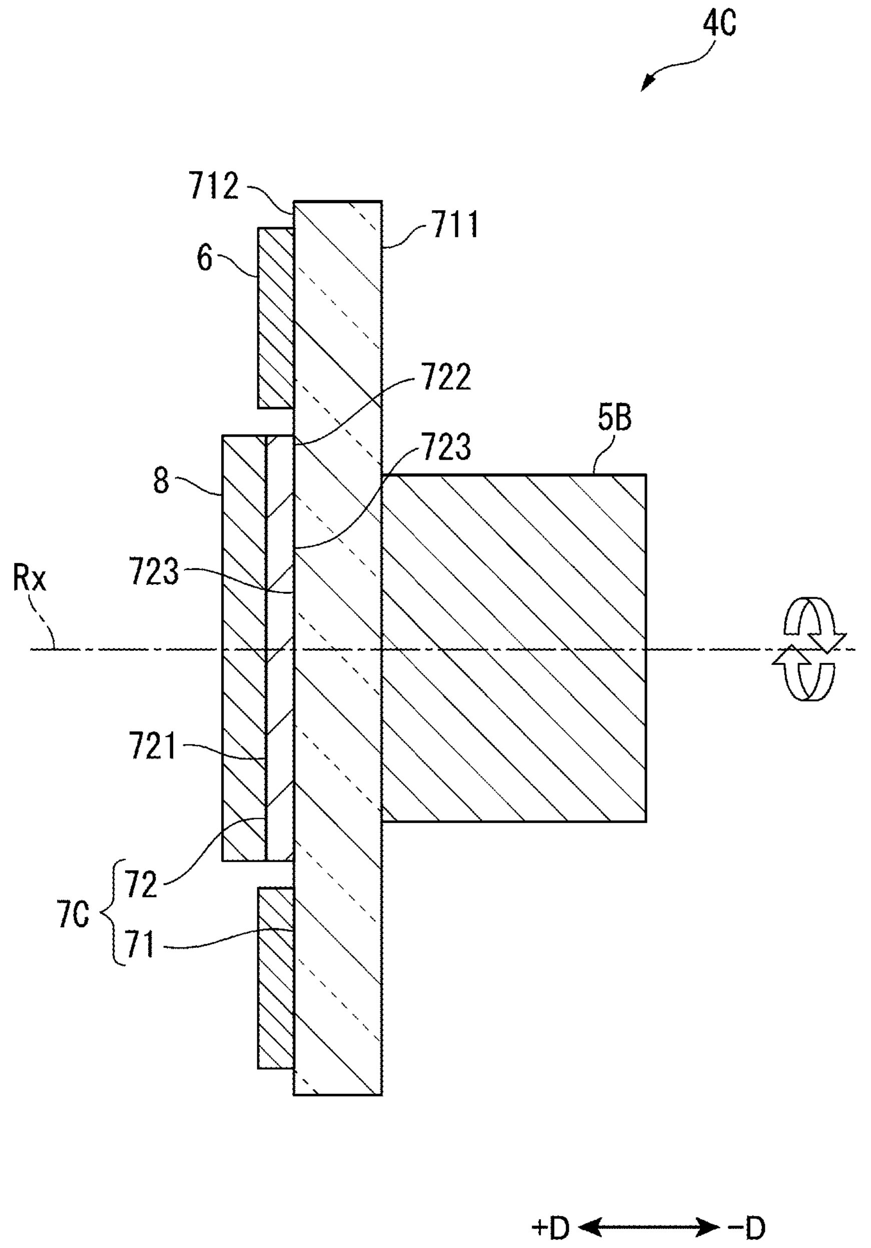
FIG. 10 is a schematic diagram showing a second modified example of the wavelength conversion device according to the first embodiment.

FIG. 10 is a schematic diagram showing a wavelength conversion device 4C according to a second modified example of the wavelength conversion device 4A.

In the wavelength conversion device 4A described above, the vapor chamber 72 is arranged at the incident side of the excitation light with respect to the substrate 71. In other words, the vapor chamber 72 is arranged at the −D direction side with respect to the substrate 71. However, this is not a limitation, and the vapor chamber 72 can be arranged at the exit side of the converted light with respect to the substrate 71, namely at the +D direction side with respect to the substrate 71.

For example, it is possible to adopt the wavelength conversion device 4C shown in FIG. 10 instead of the wavelength conversion device 4A.

Similarly to the wavelength conversion device 4B, the wavelength conversion device 4C is provided with the motor 5B, the wavelength converter 6, a rotating body 7C, and the radiator fin 8.

Similarly to the rotating body 7, the rotating body 7C is provided with the substrate 71 and the vapor chamber 72. However, in the rotating body 7C, the vapor chamber 72 is disposed on the surface 712 as the exit side of the converted light in the substrate 71. It should be noted that the outer edge of the vapor chamber 72 is arranged closer to the rotational axis Rx than the inner edge of the wavelength converter 6 when viewed from the +D direction side.

In the wavelength conversion device 4C, the radiator fin 8 is attached to a surface at an opposite side to a surface opposed to the substrate 71 in the vapor chamber 72. However, the radiator fin 8 can be fixed to the rotating body 7C with an adhesive or the like so that the base part 81 is coupled to the surface 712 of the substrate 71.

It should be noted that the motor 5B is fixed to the surface 711 of the substrate 71 with a fixture or an adhesive. In contrast, when the motor 5 is adopted instead of the motor 5B, the rotating body 7C and the motor 5 can be fixed to each other in a state in which the insertion part 54 is inserted into the through opening 714 of the substrate 71.

In such a wavelength conversion device 4C, the heat transferred from the wavelength converter 6 to the substrate 71 is received by the heat receiver 722 arranged at the outer circumferential edge of the vapor chamber 72 when viewed from the +D direction side.

The heat received by the heat receiver 722 evaporates the working fluid in the liquid phase, and the working fluid in the vapor phase is diffused inside the sealed container 721. A part of the working fluid in the vapor phase thus diffused transfers the heat to the heat dissipater 723 in the vapor chamber 72 to thereby be condensed, and changes to the working fluid in the liquid phase. The heat transferred to a part opposed to the substrate 71 out of the heat dissipater 723 is transferred to a portion at the rotational axis Rx side in the substrate 71 to thereby be released. The heat transmitted to a part opposed to the radiator fin 8 out of the heat dissipater 723 is transferred to the radiator fin 8, and is then transferred to the airflow due to the rotation to thereby be released.

It should be noted that the working fluid in the liquid phase located inside the sealed container 721 is moved to the outer circumferential edge of the sealed container 721 due to the centrifugal force generated by the rotation of the rotating body 7C. In other words, the working fluid in the liquid phase is moved to the heat receiver 722 due to the centrifugal force by the rotating body 7C.

Such a wavelength conversion device 4C exerts the following advantages in addition to substantially the same advantages as those of the wavelength conversion device 4A described above.

In the wavelength conversion device 4C, the motor 5B is arranged at the incident side of the excitation light with respect to the substrate 71. The wavelength converter 6 and the vapor chamber 72 are arranged at an opposite side to the incident side of the excitation light with respect to the substrate 71.

According to such a configuration, it is possible to shorten the path of the heat transferred from the wavelength converter 6 to the vapor chamber 72 via the substrate 71 compared to when the wavelength converter 6 is arranged at an opposite side to the incident side of the excitation light with respect to the substrate 71, and the vapor chamber 72 is arranged at the incident side of the excitation light with respect to the substrate 71. Thus, it is possible to make it easy to transfer the heat to the vapor chamber 72 from the wavelength converter 6, and it is possible to increase the cooling efficiency of the wavelength converter 6.

Further, it is possible to decrease the dimension of the wavelength conversion device 4C in a direction along the rotational axis Rx compared to when one of the wavelength converter 6 and the vapor chamber 72 is arranged at the incident side of the excitation light with respect to the substrate 71, and the other thereof is arranged at the opposite side to the incident side of the excitation light with respect to the substrate 71.

Third Modified Example of First Embodiment

Figure 11:
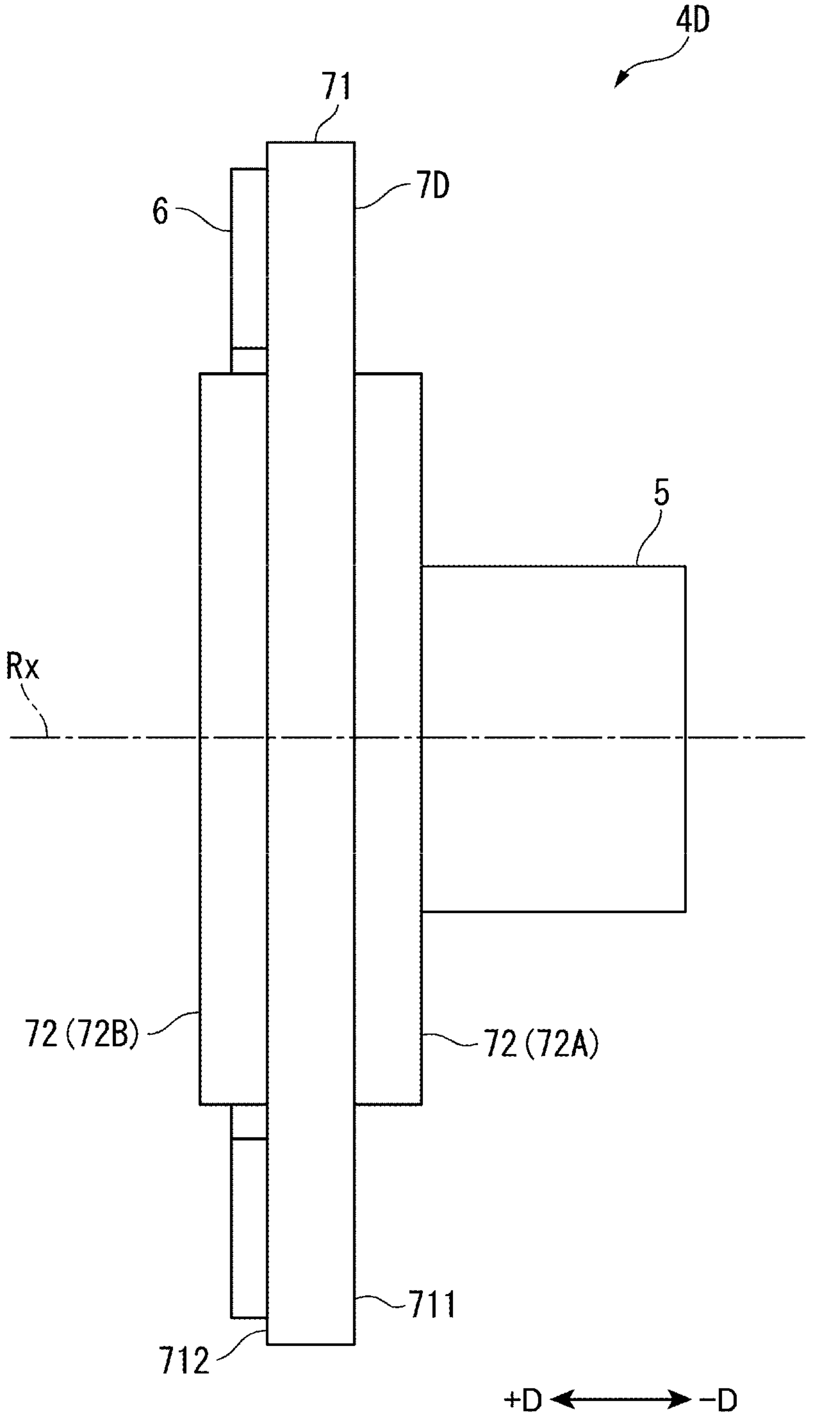
FIG. 11 is a schematic diagram showing a third modified example of the wavelength conversion device according to the first embodiment.

FIG. 11 is a schematic diagram showing a wavelength conversion device 4D according to a third modified example of the wavelength conversion device 4A.

In the wavelength conversion device 4A described above, the vapor chamber 72 is arranged on the surface 711 at the incident side of the excitation light with respect to the substrate 71. Further, in the wavelength conversion device 4C described above, the vapor chamber 72 is arranged on the surface 712 at the opposite side to the incident side of the excitation light with respect to the substrate 71. However, this is not a limitation, and it is possible for the vapor chamber 72 to be arranged on each of the surfaces 711, 712 of the substrate 71.

For example, it is possible to adopt the wavelength conversion device 4D shown in FIG. 11 instead of the wavelength conversion device 4A.

The wavelength conversion device 4D is provided with the motor 5, the wavelength converter 6, and a rotating body 7D, and is further provided with the radiator fin 8 although not shown in the drawings.

As shown in FIG. 11, the rotating body 7D is provided with the substrate 71, and vapor chambers 72A, 72B.

The vapor chamber 72A is arranged at the incident side of the excitation light with respect to the substrate 71, and is coupled to the surface 711. The vapor chamber 72B is arranged at the opposite side to the incident side of the excitation light with respect to the substrate 71, and is coupled to the surface 712. The vapor chambers 72A, 72B are each provided with substantially the same configuration as that of the vapor chamber 72 described above, and are arranged inside the wavelength converter 6 when viewed from the ±D directions.

It should be noted that the radiator fin 8 can be arranged at the incident side of the excitation light with respect to the vapor chamber 72A to be coupled to the vapor chamber 72A, or can be arranged at the opposite side to the incident side of the excitation light with respect to the vapor chamber 72B to be coupled to the vapor chamber 72B.

Further, it is possible for the wavelength conversion device 4D to be provided with the motor 5B instead of the motor 5.

Such a wavelength conversion device 4D can exert substantially the same advantages as those of the wavelength conversion devices 4A, 4C described above.

Second Embodiment

Then, a second embodiment of the present disclosure will be described.

A projector according to the present embodiment is provided with substantially the same configuration as that of the projector 1 according to the first embodiment, but is different therefrom in the configuration of the wavelength conversion device constituting the light source device 31. It should be noted that in the following description, a part which is the same or substantially the same as the part having already been described is denoted by the same reference symbol to omit the description thereof.

Figure 12:
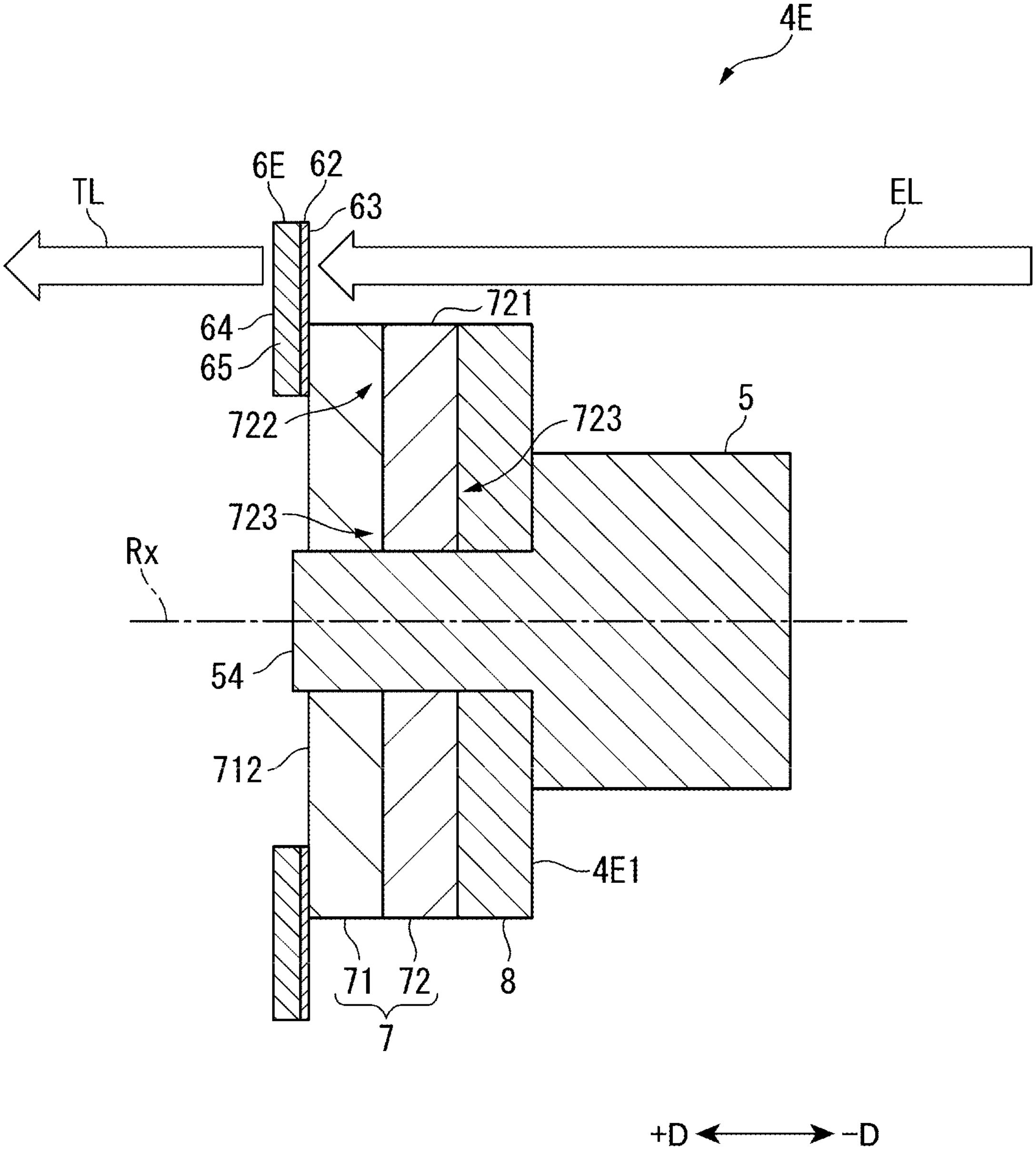
FIG. 12 is a schematic diagram showing a wavelength conversion device constituting a light source device provided to a projector according to a second embodiment.

FIG. 12 is a schematic diagram showing a wavelength conversion device 4E constituting the light source device provided to the projector according to the present embodiment.

The projector according to the present embodiment has substantially the same configuration and functions as those of the projector 1 according to the first embodiment except the point that the wavelength conversion device 4E shown in FIG. 12 is provided instead of the wavelength conversion device 4A. In other words, the light source device according to the present embodiment has substantially the same configuration and functions as those of the light source device 31 according to the first embodiment except the point that the wavelength conversion device 4E is provided instead of the wavelength conversion device 4A.

Similarly to the wavelength conversion device 4A, the wavelength conversion device 4E is a transmissive wavelength conversion device for emitting converted light TL, which is the fluorescence obtained by performing the wavelength conversion on the excitation light EL entering the wavelength conversion device 4E toward the +D direction, along the incident direction of the excitation light EL. The wavelength conversion device 4E is provided with substantially the same configuration and functions as those of the wavelength conversion device 4A except the point that a wavelength converter 6E is provided instead of the wavelength converter 6. In other words, the wavelength conversion device 4E is provided with the motor 5, the wavelength converter 6E, the rotating body 7, and the radiator fin 8. In other words, the wavelength conversion device 4E is provided with the motor 5, and a wavelength conversion element 4E1 which has the wavelength converter 6E, the rotating body 7, and the radiator fin 8 all rotated by the motor 5.

In the present embodiment, the substrate 71 of the rotating body 7 is formed of metal such as aluminum or copper so as to have a disk-like shape. Further, the vapor chamber 72 of the rotating body 7 is disposed on the surface 711 at the incident side of the excitation light in the substrate 71.

Configuration of Wavelength Converter

Similarly to the wavelength converter 6, the wavelength converter 6E performs the wavelength conversion on the excitation light having entered the wavelength converter 6E. The wavelength converter 6E is provided with a phosphor layer 65 and the reflecting layer 62. It should be noted that the plane of incidence 63 of the wavelength converter 6E is a surface at the −D direction side in the reflecting layer 62, and an exit surface 64 of the wavelength converter 6E is a surface at the +D direction side in the phosphor layer 65.

The phosphor layer 65 is formed of a phosphor ceramic as a ceramic including phosphor particles. As the phosphor ceramic, there can be cited a ceramic mainly having, for example, a garnet structure. As the ceramic having the garnet structure, there can be cited a composition including at least one of $Y_3Al_5O_{12}$, $TbAl_5O_{12}$, and $LuAl_5O_{12}$. It should be noted that the phosphor layer 65 can include a ceramic having a perovskite structure or a monolithic structure besides the ceramic having the garnet structure. The phosphor layer 65 includes an activator agent as an impurity acting as a radiative center. As the activator agent, there can be illustrated Ce, Eu, Pr, Cr, Gd, and Ga.

The wavelength converter 6E is formed to have a ring-like shape centering on the rotational axis Rx when viewed from the +D direction side, and is attached to the outer circumferential edge of the substrate 71 when viewed from the +D direction side so as to project outward from the circumferential edge of the substrate 71. On this occasion, the wavelength converter 6E is arranged so that a part of the plane of incidence 63 is coupled to the surface 712 at the +D direction side in the substrate 71.

In such a wavelength conversion device 4E, the wavelength converter 6E projects outward in the radial direction centering on the rotational axis Rx from the circumferential edge of the substrate 71. Therefore, the plane of incidence 63 which is constituted by the reflecting layer 62, and which the excitation light EL enters in the wavelength converter 6E is exposed outside, and has contact with an air layer. Thus, a part of the excitation light on which the wavelength conversion has not been performed, and which enters the reflecting layer 62 from the wavelength converter 6E can totally be reflected by an interface between the reflecting layer 62 and the air layer due to a refractive index difference between the air layer and the reflecting layer 62, and thus, it is possible to prevent that part of the excitation light from being emitted toward the −D direction from the reflecting layer 62. In other words, since it is possible to increase the critical angle at the interface between the reflecting layer 62 and the air layer by the reflecting layer 62 having contact with the air layer at the −D direction side, a part of the excitation light which is emitted from the reflecting layer 62 to the outside at the −D direction side, and is lost can totally be reflected toward the +D direction by the boundary between the reflecting layer 62 and the air layer. Therefore, since it is possible to make that part of the excitation light reenter the phosphor included in the wavelength converter 6E, it is possible to increase the use efficiency of the excitation light in the wavelength converter 6E.

Heat Transfer in Wavelength Conversion Device

In such a wavelength conversion device 4E, the heat generated in the wavelength converter 6E is transferred to the substrate 71 to which the wavelength converter 6E is fixed. The heat transferred to the substrate 71 is received by the heat receiver 722 located in a portion at the outer circumferential side in the vapor chamber 72. Thus, the working fluid in the liquid phase evaporates on the inner surface of the heat receiver 722 due to the heat received by the heat receiver 722, and the working fluid in the vapor phase diffuses inside the sealed container 721.

The working fluid in the vapor phase having diffused inside the sealed container 721 transfers the heat to the heat dissipater 723 corresponding to a portion of the substrate 71 at the rotational axis Rx side, and the heat dissipater 723 corresponding to a portion having contact with the radiator fin 8 in the sealed container 721, and is then condensed by each of the heat dissipaters 723. The working fluid which is condensed to change from the vapor phase to the liquid phase moves from the rotational axis Rx side to the outer circumferential side due to the centrifugal force by the rotating body 7, and then reaches the heat receiver 722 once again.

Meanwhile, the heat transferred from the vapor chamber 72 to the substrate 71 is released to the outside from the portion at the rotational axis Rx side in the substrate 71.

On the other hand, the heat transferred from the vapor chamber 72 to the radiator fin 8 is transferred from the plurality of fins 82 omitted from the illustration in FIG. 12 to the airflow generated by the rotation of the radiator fin 8 centering on the rotational axis Rx to thereby be released.

Advantages of Second Embodiment

The projector according to the present embodiment described hereinabove is capable of exerting substantially the same advantages as those of the projector 1 according to the first embodiment, and in addition, exerts the following advantages.

In the wavelength conversion device 4E, the wavelength converter 6E is disposed so as to project to the outer side from the circumferential edge of the substrate 71.

According to such a configuration, since the excitation light EL and the converted light TL are not transmitted through the rotating body 7, it is possible to prevent the loss of the excitation light EL and the converted light TL caused by being transmitted through the rotating body 7 from occurring.

Further, since the wavelength converter 6E projects to the outer side from the circumferential edge of the rotating body 7, it is possible to make it easy to increase the dimension in the circumferential direction centering on the rotational axis Rx in the wavelength converter 6E. Thus, since it is possible to spread the portions which generate heat due to the excitation light EL entering the wavelength converter 6E in the wavelength converter 6E, it is possible to suppress the rise in temperature of the wavelength converter 6E.

In the wavelength conversion device 4E, the wavelength converter 6E is provided with the reflecting layer 62 which constitutes the plane of incidence 63, transmits the excitation light EL, and reflects the converted light TL. The plane of incidence 63 is exposed to the outside.

According to such a configuration, by the plane of incidence 63 being exposed to the outside, it results in that the plane of incidence 63 makes contact with the air layer. In other words, a surface at the opposite side to the phosphor layer 61 in the reflecting layer 62 makes contact with the air layer. Therefore, it is possible to prevent the excitation light EL on which the wavelength conversion has not been performed from being emitted to the outside of the wavelength converter 6E from the reflecting layer 62 due to the refractive index difference between the reflecting layer and the air layer. In other words, at least a part of the excitation light EL which is emitted to the outside from the reflecting layer 62 to thereby be lost can totally be reflected by the interface between the reflecting layer 62 and the air layer. Therefore, it is possible to increase the use efficiency of the excitation light EL in the wavelength converter 6E.

First Modified Example of Second Embodiment

In the wavelength conversion device 4E described above, it is assumed that the vapor chamber 72 is arranged at the –D direction side as the incident side of the excitation light with respect to the substrate 71. However, this is not a limitation, and the vapor chamber 72 can be arranged at the +D direction side as the exit side of the converted light with respect to the substrate 71. In other words, similarly to the wavelength conversion device 4C shown in FIG. 10, it is possible for the vapor chamber 72 to be fixed to the surface 711 facing to the +D direction side in the substrate 71.

In this case, the outer circumferential edge of the vapor chamber 72 is arranged closer to the rotational axis Rx than the inner circumferential edge of the wavelength converter 6E when viewed from the +D direction side. Further, the motor 5 can be directly coupled to the substrate 71, or can also be coupled to the substrate 71 via the radiator fin 8.

Further, it is possible for the radiator fin 8 to be coupled to the surface 711 at the –D direction side in the substrate 71. Further, when the vapor chamber 72 is arranged at the +D direction side with respect to the substrate 71, the radiator fin 8 can be disposed on a surface at the +D direction side in the vapor chamber 72. In other words, in the wavelength conversion device 4E, it is sufficient for the radiator fin 8 to be coupled to at least one of the substrate 71 and the vapor chamber 72.

Second Modified Example of Second Embodiment

In the wavelength conversion device 4E described above, it is assumed that the wavelength converter 6E is arranged at the +D direction side as the exit side of the converted light with respect to the substrate 71. However, this is not a limitation, and the wavelength converter 6E can be arranged at the –D direction side as the incident side of the excitation light with respect to the rotating body 7.

In this case, when the vapor chamber 72 is arranged at the –D direction side with respect to the substrate 71, the wavelength converter 6E can be disposed on a surface at the –D direction side in the vapor chamber 72. Alternatively, as long as the vapor chamber 72 is arranged at the –D direction side with respect to the substrate 71, and the circumferential edge of the substrate 71 projects from the vapor chamber 72, it is possible for the wavelength converter 6E to be arranged on the surface at the –D direction side of the substrate 71.

When the vapor chamber 72 is arranged at the +D direction side with respect to the substrate 71, the wavelength converter 6E can be disposed on the surface at the –D direction side in the substrate 71.

Further, the radiator fin 8 can be arranged at the –D direction side with respect to the rotating body 7 to be coupled to the substrate 71 or the vapor chamber 72, or can be arranged at the +D direction side with respect to the rotating body 7 to be coupled to the substrate 71 or the vapor chamber 72.

Third Embodiment

Then, a third embodiment of the present disclosure will be described.

A projector according to the present embodiment is provided with substantially the same configuration as that of the projectors according to the first embodiment and the second embodiment, but is different therefrom in the configuration of the rotating body provided to the wavelength conversion device. It should be noted that in the following description, a part which is the same or substantially the same as the part having already been described is denoted by the same reference symbol to omit the description thereof.

Figure 13:
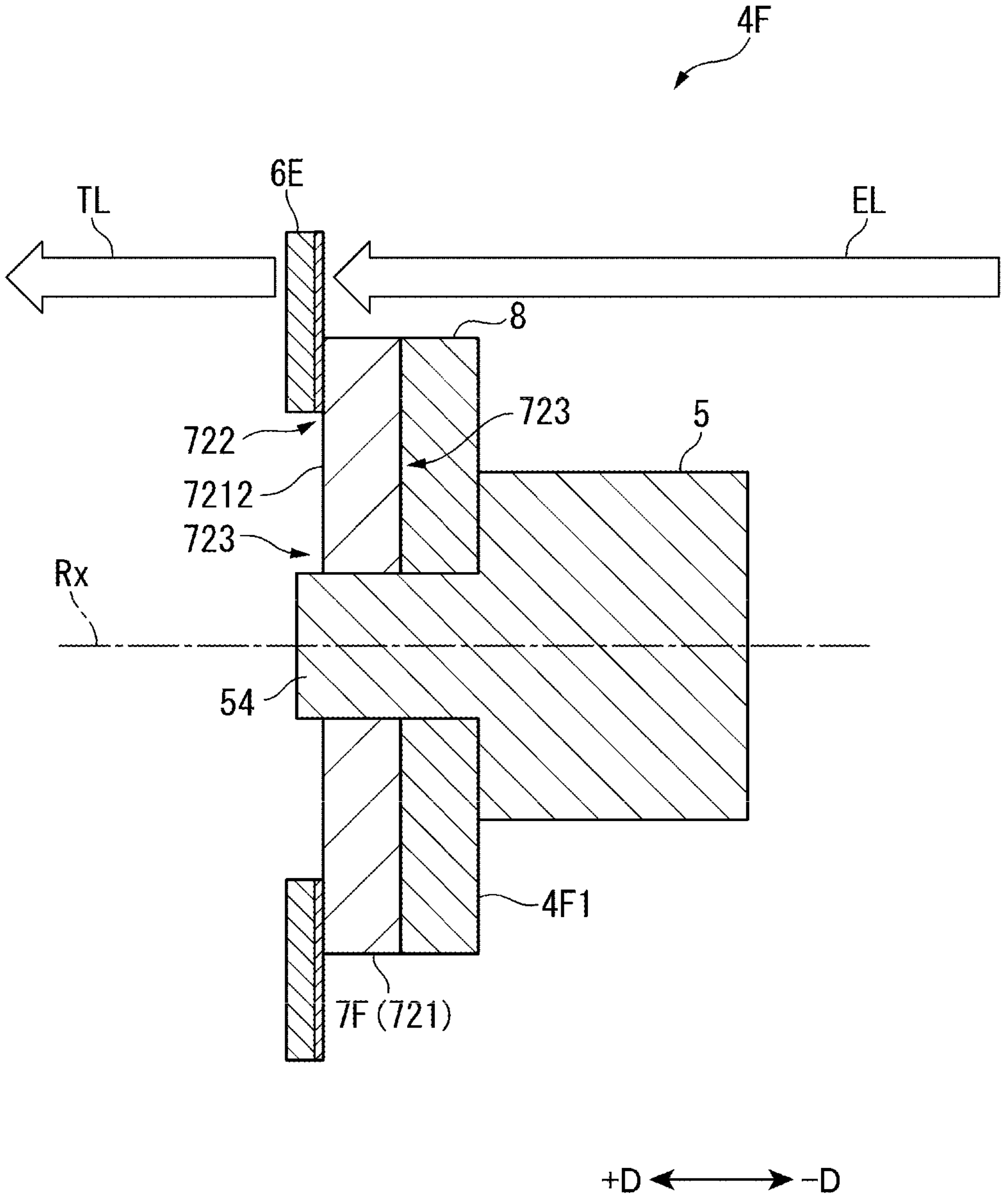
FIG. 13 is a schematic diagram showing a wavelength conversion device constituting a light source device provided to a projector according to a third embodiment.

FIG. 13 is a schematic diagram showing a wavelength conversion device 4F constituting a light source device provided to the projector according to the present embodiment.

The projector according to the present embodiment has substantially the same configuration and functions as those of the projector 1 according to the first embodiment except the point that the wavelength conversion device 4F shown in FIG. 13 is provided instead of the wavelength conversion device 4A. In other words, the light source device according to the present embodiment has substantially the same configuration and functions as those of the light source device 31 according to the first embodiment except the point that the wavelength conversion device 4F is provided instead of the wavelength conversion device 4A.

Similarly to the wavelength conversion device 4A, the wavelength conversion device 4F is a transmissive wavelength conversion device for emitting converted light TL, which is the fluorescence obtained by performing the wavelength conversion on the excitation light EL entering the wavelength conversion device 4F toward the +D direction, along the incident direction of the excitation light EL. The wavelength conversion device 4F is provided with substantially the same configuration and functions as those of the wavelength conversion device 4E except the point that a rotating body 7F is provided instead of the rotating body 7. In other words, the wavelength conversion device 4F is provided with the motor 5, the wavelength converter 6E, the rotating body 7F, and the radiator fin 8. In other words, the wavelength conversion device 4F is provided with the motor 5, and a wavelength conversion element 4F1 which has the wavelength converter 6E, the rotating body 7F, and the radiator fin 8 all rotated by the motor 5.

Configuration of Rotating Body

The rotating body 7F is formed of the vapor chamber 72. Specifically, the rotating body 7F of the wavelength conversion device 4F is provided with a substrate formed of the vapor chamber 72.

In the present embodiment, the vapor chamber 72 is formed to have a disk-like shape centering on the rotational axis Rx. In the sealed container 721 of the vapor chamber 72, the wavelength converter 6E is disposed on the outer circumferential edge of the surface 7212 at the +D direction side as the exit side of the converted light so as to project to the outside of the rotating body 7F when viewed from the +D direction side. On the outer circumferential edge where the wavelength converter 6E is disposed in the sealed container 721, there is disposed the heat receiver 722 for receiving the heat from the wavelength converter 6E.

The heat dissipater 723 corresponding to the portion at the rotational axis Rx side in the surface 7212 of the sealed container 721 releases the heat received from the working fluid in the vapor phase located inside the sealed container 721 to the outside. It should be noted that it is possible to dispose a radiator fin to be coupled to the heat dissipater 723 located on the surface 7212.

The heat dissipater 723 corresponding to a portion opposed to the radiator fin 8 in the surface 7211 of the sealed container 721 releases the heat received from the working fluid in the vapor phase located inside the sealed container 721 to the radiator fin 8.

It should be noted that when there exists the heat dissipater not provided with the radiator fin 8 out of the heat dissipater 723, that heat dissipater transfers the heat to the ambient air of the wavelength conversion device 4F.

Advantages of Third Embodiment

The projector according to the present embodiment described hereinabove exerts substantially the same advantages as those of the projector 1 according to the first embodiment described above, and in addition, exerts the following advantages.

In the wavelength conversion device 4F, the substrate of the rotating body 7F is formed of the vapor chamber 72 having the disk-like shape.

According to such a configuration, since the vapor chamber 72 directly supports the wavelength converter 6E, it is possible to make it easy to transfer the heat from the wavelength converter 6E to the vapor chamber 72.

Thus, it is possible to increase the cooling efficiency of the wavelength converter 6E. Besides the above, it is possible to decrease the number of components of the rotating body 7F compared to when the rotating body 7F is provided with the substrate and the vapor chamber separately from each other.

In the wavelength conversion device 4F, the wavelength converter 6E is disposed on the surface 7212 at the opposite side to the motor 5 in the rotating body 7F.

According to such a configuration, it is possible to prevent the converted light TL from being blocked by the rotating body 7F, and in addition, it is possible to shorten the distance between the second light collection element 316 arranged in the posterior stage of the wavelength conversion device 4F and the wavelength converter 6E. Therefore, it is possible to make it easy for the second light collection element 316 to collect the converted light TL emitted from the wavelength converter 6E.

Modification of Third Embodiment

Figure 14:
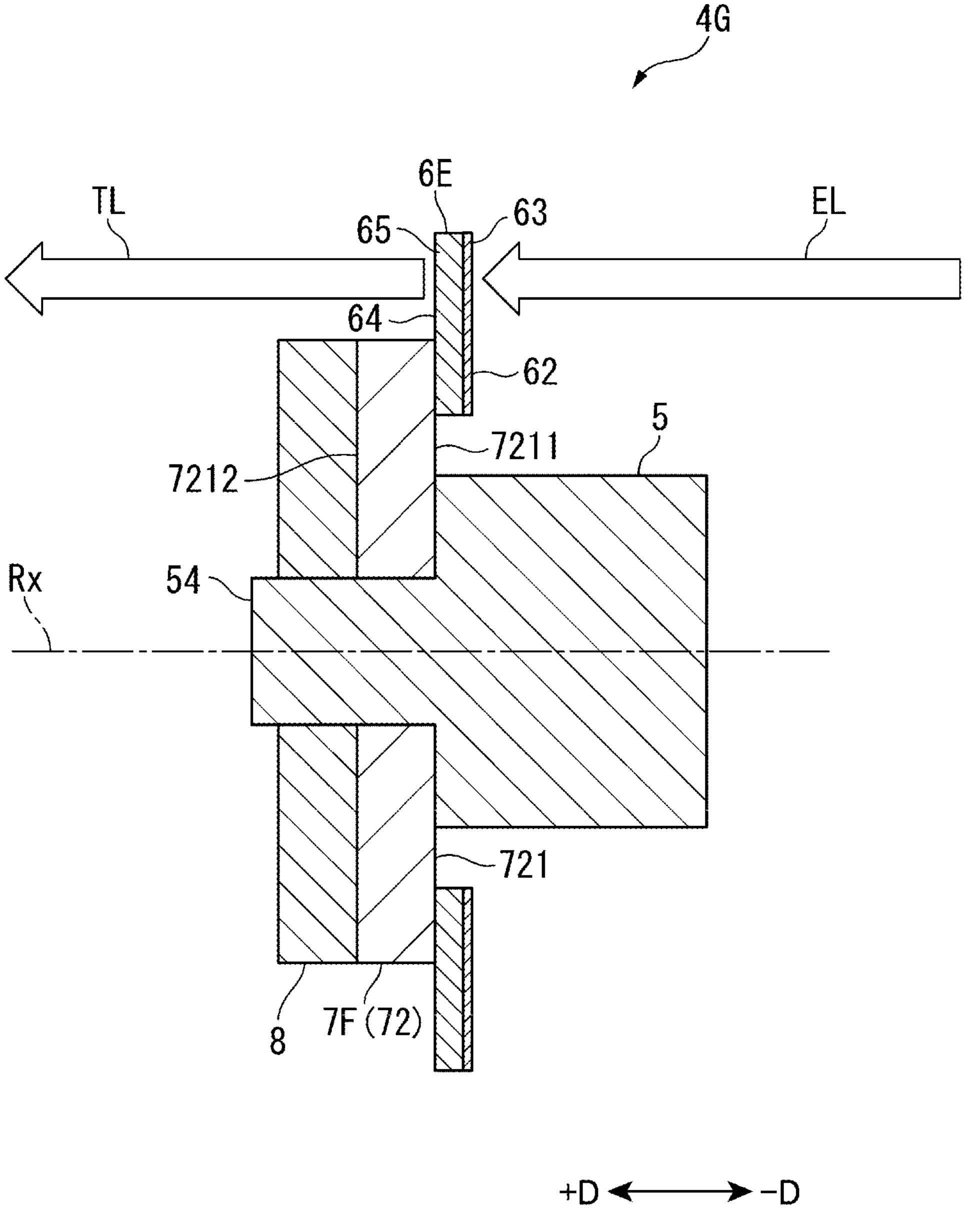
FIG. 14 is a schematic diagram showing a modification of the wavelength conversion device according to the third embodiment.

FIG. 14 is a schematic diagram showing a modification of the wavelength conversion device 4F.

In the wavelength conversion device 4F described above, the wavelength converter 6E is disposed on the surface 7212 at the +D direction side in the vapor chamber 72 constituting the rotating body 7F. However, this is not a limitation, and it is possible for the wavelength converter 6E to be disposed on the surface 7211 at the −D direction side in the vapor chamber 72. Specifically, the wavelength converter 6E can be coupled to the surface 7211.

For example, it is possible to adopt a wavelength conversion device 4G shown in FIG. 14 instead of the wavelength conversion device 4F.

Similarly to the wavelength conversion device 4F, the wavelength conversion device 4G is provided with the motor 5, the wavelength converter 6E, the rotating body 7F, and the radiator fin 8.

In the wavelength conversion device 4G, the wavelength converter 6E is disposed in the outer circumferential edge portion of the surface 7211 at the −D direction side in the vapor chamber 72 constituting the rotating body 7F so as to project to the outside of the rotating body 7F when viewed from the −D direction side. On this occasion, the exit surface 64 constituted by the phosphor layer 61 of the wavelength converter 6E and the surface 7211 are coupled to each other.

Further, the radiator fin 8 is arranged at the +D direction side with respect to the vapor chamber 72. In other words, the radiator fin 8 is disposed on the surface 7212 at the +D direction side in the vapor chamber 72.

According also to the wavelength conversion device 4G having such a configuration, it is possible to exert substantially the same advantages as those of the wavelength conversion device 4F in which the wavelength converter 6E is arranged on the surface 7212 of the vapor chamber 72.

Fourth Embodiment

Then, a fourth embodiment of the present disclosure will be described.

A projector according to the present embodiment is provided with substantially the same configuration as that of the projector according to the first embodiment, but is different therefrom in the configuration of the vapor chamber of the rotating body provided to the wavelength conversion device. It should be noted that in the following description, a part which is the same or substantially the same as the part having already been described is denoted by the same reference symbol to omit the description thereof.

Figure 15:
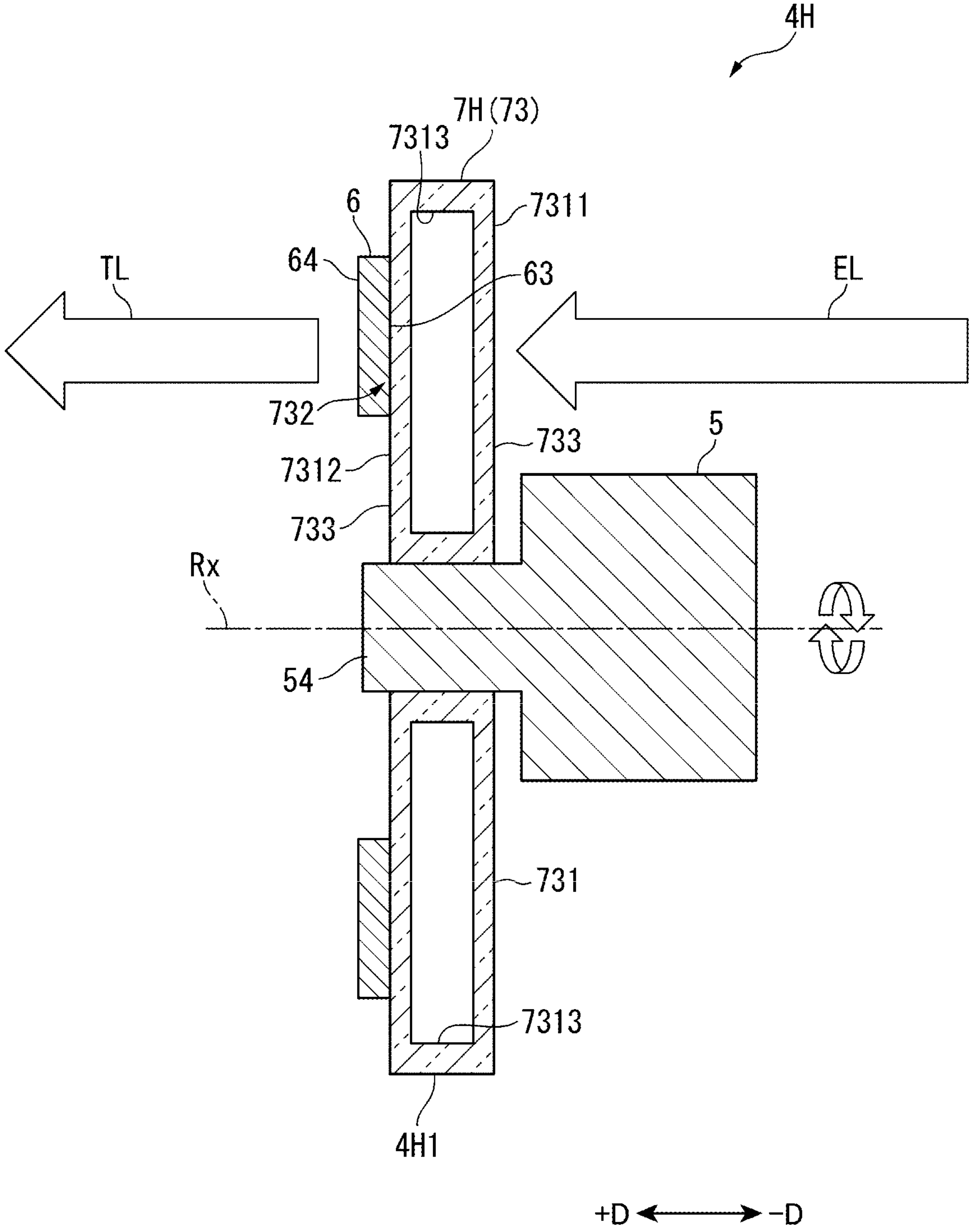
FIG. 15 is a schematic diagram showing a wavelength conversion device constituting a light source device provided to a projector according to a fourth embodiment.

FIG. 15 is a cross-sectional view showing a wavelength conversion device 4H constituting a light source device provided to the projector according to the present embodiment.

The projector according to the present embodiment has substantially the same configuration and functions as those of the projector 1 according to the first embodiment except the point that the wavelength conversion device 4H shown in FIG. 15 is provided instead of the wavelength conversion device 4A. In other words, the light source device according to the present embodiment has substantially the same configuration and functions as those of the light source device 31 according to the first embodiment except the point that the wavelength conversion device 4H is provided instead of the wavelength conversion device 4A.

Similarly to the wavelength conversion device 4A, the wavelength conversion device 4H is a transmissive wavelength conversion device for emitting converted light, which is the fluorescence obtained by performing the wavelength conversion on the excitation light entering the wavelength conversion device 4H toward the +D direction, along the incident direction of the excitation light. The wavelength conversion device 4H is provided with substantially the same configuration and functions as those of the wavelength conversion device 4A except the point that a rotating body 7H is provided instead of the rotating body 7. Specifically, the wavelength conversion device 4H is provided with the motor 5, the wavelength converter 6, and the rotating body 7H, and is further provided with the radiator fin 8 not shown in FIG. 15. In other words, the wavelength conversion device 4H is provided with the motor 5, and a wavelength conversion element 4H1 which has the wavelength converter 6, the rotating body 7H, and the radiator fin 8 all rotated by the motor 5.

Configuration of Rotating Body

The rotating body 7H is provided with a vapor chamber 73 having a function as a substrate for supporting the wavelength converter 6 instead of the substrate 71 and the vapor chamber 72. In other words, the rotating body 7H has a substrate as the vapor chamber 73.

Similarly to the vapor chamber 72 related to the first embodiment, the vapor chamber 73 is a heat transport body for receiving and then transporting the heat of the wavelength converter 6, and supports the wavelength converter 6. The vapor chamber 73 is provided with a sealed container 731 having a light transmissive property.

The sealed container 731 is formed of a material having the light transmissive property, and houses a working fluid having the light transmissive property. In the present embodiment, the sealed container 731 is formed of glass.

The sealed container 731 has a surface 7311 at the −D direction side and a surface 7312 at the +D direction side.

In a portion at the circumferential edge side on the surface 7312 when viewed from the +D direction side, there is disposed the wavelength converter 6 having a ring-like shape centering on the rotational axis Rx. In other words, the wavelength converter 6 is provided to the vapor chamber 73, and the excitation light EL enters the wavelength converter 6 via the vapor chamber 73 having the light transmissive property. Specifically, substantially the whole of the vapor chamber 73 has a light transmission area.

It should be noted that the radiator fin 8 can be disposed on the surface 7312 at the +D direction side, or can also be disposed on the surface 7311 at the −D direction side as long as the radiator fin 8 is disposed inside the wavelength converter 6 when viewed from the ±D directions.

Similarly to the sealed container 721, in the sealed container 731, a portion to which the heat is transferred from the outside becomes a heat receiver 732, and portions which are capable of releasing the heat received by the heat receiver 732 become heat dissipaters 733.

Specifically, the heat receiver 732 is a portion at the outer circumferential side corresponding to the wavelength converter 6 in the sealed container 731. The heat receiver 732 receives the heat from the wavelength converter 6.

The heat dissipaters 733 correspond respectively to a portion at the rotational axis Rx side of the heat receiver 732 on the surface 7312 in the +D direction side of the sealed container 731, and a portion of substantially the entire area of the surface 7311 at the −D direction side. The radiator fin 8 is provided to at least one of these heat dissipaters 733 as described above. It should be noted that when the radiator fin 8 is disposed on the surface 7311, the outer circumferential edge of the radiator fin 8 is arranged in the inside of the wavelength converter 6 when viewed from the −D direction side.

In such a sealed container 731, an inner surface 7313 at the outer circumferential side is arranged at the outer side in the radial direction centering on the rotational axis Rx from the wavelength converter 6. Therefore, when the rotating body 7H is rotated centering on the rotational axis Rx, the working fluid in the liquid phase is retained in a portion from a part corresponding to the wavelength converter 6 to the inner surface 7313. In other words, when the rotating body 7H is rotated, the working fluid in the liquid phase located inside the sealed container 731 moves closer to the outer circumferential side of the sealed container 731 than the incident area which the excitation light EL enters on the plane of incidence 63 of the wavelength converter 6. Thus, it is possible to efficiently supply the working fluid in the liquid phase to the heat receiver 732 arranged in the portion corresponding to the wavelength converter 6, and in addition, it is possible to prevent the working fluid in the liquid phase from blocking the excitation light.

Advantages of Fourth Embodiment

The projector according to the present embodiment described hereinabove exerts substantially the same advantages as those of the projector 1 according to the first embodiment, and in addition, exerts the following advantages.

In the wavelength conversion device 4H, the substrate of the rotating body 7H is constituted by the vapor chamber 73 having the disk-like shape provided with the sealed container 731 having the light transmissive property. The wavelength converter 6 is provided to the vapor chamber 73, and the sealed container 731 contains the working fluid having a light transmissive property. Further, the excitation light EL with which the wavelength conversion device 4H is irradiated enters the wavelength converter 6 via the vapor chamber 73.

According to such a configuration, it is possible to decrease the number of components of the rotating body 7H compared to when the rotating body 7H is provided with the substrate and the vapor chamber separately from each other. Further, since the heat generated by the wavelength converter 6 is directly transferred to the vapor chamber 73, it is possible to increase the heat transfer efficiency from the wavelength converter 6 to the vapor chamber 73. Therefore, it is possible to increase the cooling efficiency of the wavelength converter 6.

In the wavelength conversion device 4H, the working fluid in the liquid phase moves closer to the outer circumference side than the incident area which the excitation light EL enters on the plane of incidence 63 when the rotating body 7H is rotated.

According to such a configuration, it is possible to make the excitation light EL enter the wavelength converter 6 without irregularly reflecting the excitation light EL by the working fluid in the liquid phase. Therefore, it is possible to prevent the wavelength conversion efficiency of the excitation light EL from decreasing. Besides the above, it is possible to efficiently supply the working fluid in the liquid phase to the heat receiver 732 for receiving the heat from the wavelength converter 6, and in addition, it is possible to prevent the working fluid in the liquid phase from blocking the excitation light.

First Modified Example of Fourth Embodiment

In the wavelength conversion device 4H described above, it is assumed that the wavelength converter 6 is disposed on the surface 7312 at the +D direction side in the sealed container 731 of the vapor chamber 73. However, this is not a limitation, and it is possible for the wavelength converter 6 to be disposed on the surface 7311 at the −D direction side in the vapor chamber 73. In this case, when the radiator fin 8 is disposed on the surface 7311, the radiator fin 8 is disposed so that the outer circumferential edge of the radiator fin 8 is arranged in the inside of the wavelength converter 6 having the ring-like shape when viewed from the −D direction side.

Second Modified Example of Fourth Embodiment

Figure 16:
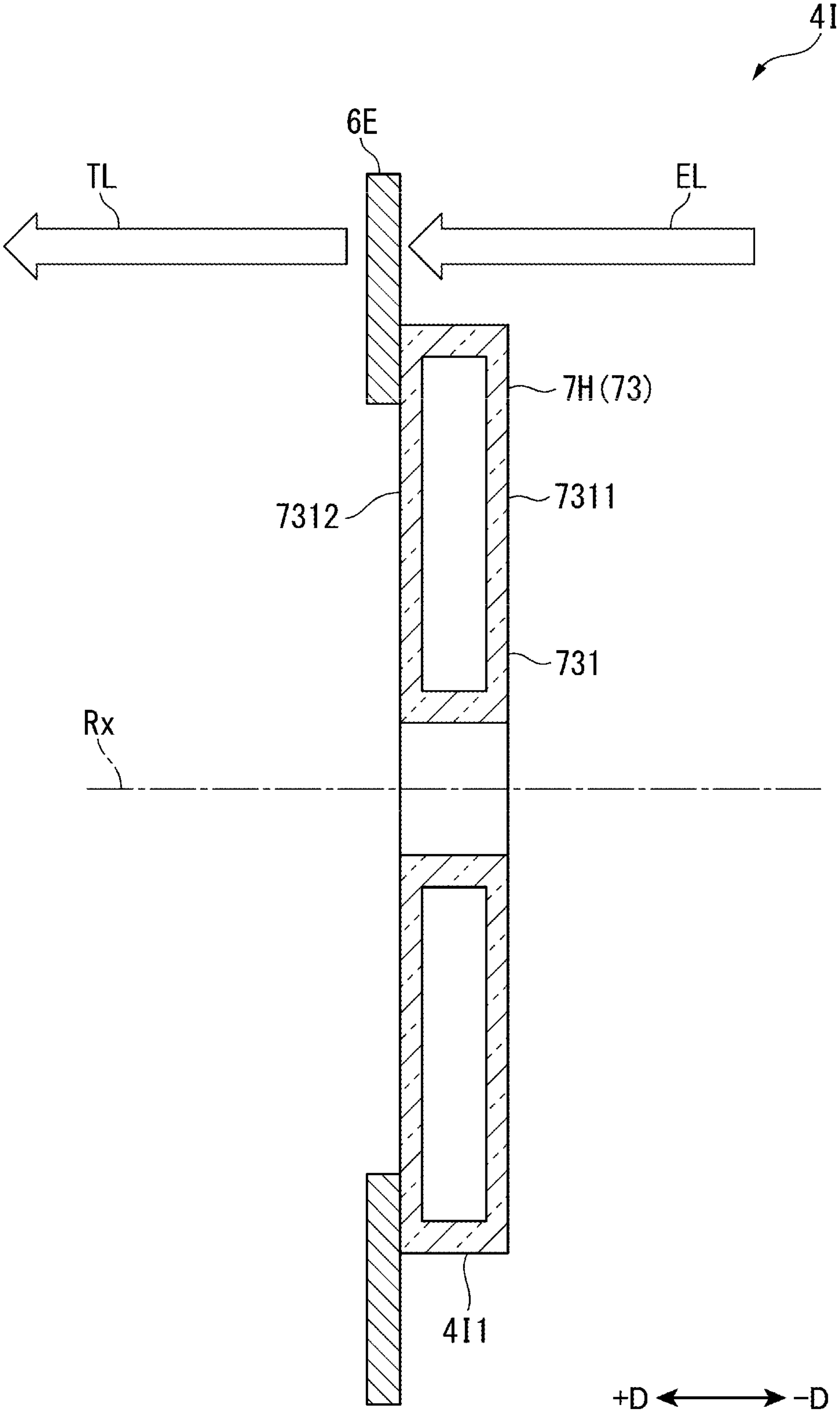
FIG. 16 is a schematic diagram showing a second modified example of the wavelength conversion device according to the fourth embodiment.

FIG. 16 is a cross-sectional view showing a wavelength conversion device 4I as a second modified example of the wavelength conversion device 4H. It should be noted that the illustration of the motor 5 and the radiator fin 8 is omitted in FIG. 16.

In the wavelength conversion device 4H described above, it is assumed that the wavelength converter 6 is arranged on the surface 7312 at the +D direction side in the vapor chamber 73, and the excitation light enters the wavelength converter 6 via the vapor chamber 73 having the light transmissive property. However, this is not a limitation, and the wavelength converter can be disposed on the outer peripheral edge of the vapor chamber 73 so as to project to the outside of the vapor chamber 73 when viewed from the +D direction side or the −D direction side similarly to the wavelength converter 6E of the wavelength conversion device 4E shown in FIG. 12.

For example, it is possible to adopt the wavelength conversion device 4I shown in FIG. 16 in contrast to the wavelength conversion device 4H.

The wavelength conversion device 4I is provided with substantially the same configuration and functions as those of the wavelength conversion device 4H except the point that the wavelength converter 6E is provided instead of the wavelength converter 6. Specifically, the wavelength conversion device 4I is provided with the wavelength converter 6E, and the rotating body 7H, and is further provided with the motor 5, and the radiator fin 8 not shown in FIG. 16. In other words, the wavelength conversion device 4I is provided with the motor 5, and a wavelength conversion element 411 which has the wavelength converter 6E, the rotating body 7H, and the radiator fin 8 all rotated by the motor 5.

Similarly to the wavelength converter 6E of the wavelength conversion device 4E, the wavelength converter 6E is disposed on the outer circumferential edge of the surface 7312 at the +D direction side in the vapor chamber 73 so as to project to the outer side of the vapor chamber 73 when viewed from the +D direction side. It should be noted that the wavelength converter 6E can be disposed on the outer circumferential edge of the surface 7311 at the −D direction side in the vapor chamber 73 so as to project to the outer side of the vapor chamber 73 when viewed from the −D direction side.

According also to such a wavelength conversion device 4I, it is possible to exert substantially the same advantages as those of the wavelength conversion device 4H.

It should be noted that it is possible to make blue light enter the position where the excitation light EL does not enter in the vapor chamber 73, and dispose a diffuse transmission element at the incident position of the blue light. In this case, it is possible to emit the converted light from the wavelength conversion device 4I, and in addition, it is possible to emit the blue light substantially homogenized in illumination distribution.

Fifth Embodiment

Then, a fifth embodiment of the present disclosure will be described.

A projector according to the present embodiment is provided with substantially the same configuration as that of the projector 1 according to the first embodiment, but is different therefrom in the configuration of the rotating body provided to the wavelength conversion device. It should be noted that in the following description, a part which is the same or substantially the same as the part having already been described is denoted by the same reference symbol to omit the description thereof.

Figure 17:
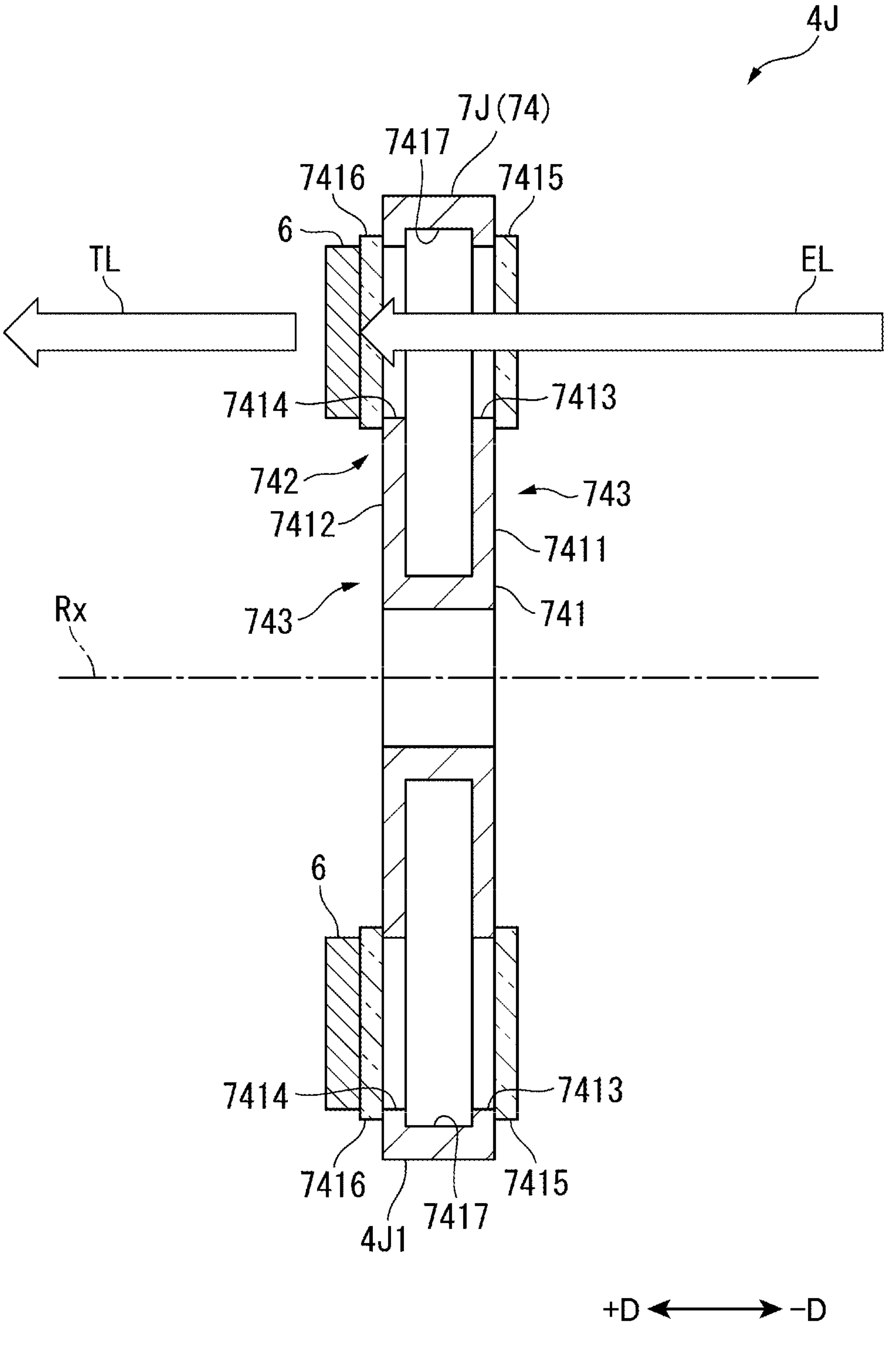
FIG. 17 is a schematic diagram showing a wavelength conversion device constituting a light source device provided to a projector according to a fifth embodiment.

FIG. 17 is a cross-sectional view showing a wavelength conversion device 4J constituting a light source device provided to the projector according to the present embodiment. It should be noted that the illustration of the motor 5 and the radiator fin 8 is omitted in FIG. 17.

The projector according to the present embodiment has substantially the same configuration and functions as those of the projector 1 according to the first embodiment except the point that the wavelength conversion device 4J shown in FIG. 17 is provided instead of the wavelength conversion device 4A. In other words, the light source device according to the present embodiment has substantially the same configuration and functions as those of the light source device 31 according to the first embodiment except the point that the wavelength conversion device 4J is provided instead of the wavelength conversion device 4A.

Similarly to the wavelength conversion device 4A, the wavelength conversion device 4J is a transmissive wavelength conversion device for emitting converted light, which is the fluorescence obtained by performing the wavelength conversion on the excitation light entering the wavelength conversion device 4J toward the +D direction, along the incident direction of the excitation light. The wavelength conversion device 4J is provided with substantially the same configuration and functions as those of the wavelength conversion device 4A except the point that a rotating body 7J is provided instead of the rotating body 7. Specifically, the wavelength conversion device 4J is provided with the wavelength converter 6, and the rotating body 7J, and is further provided with the motor 5, and the radiator fin 8 not shown in FIG. 17. In other words, the wavelength conversion device 4J is provided with the motor 5, and a wavelength conversion element 4J1 which has the wavelength converter 6, the rotating body 7J, and the radiator fin 8 all rotated by the motor 5.

Similarly to the rotating body 7H, the rotating body 7J is provided with a vapor chamber 74 having a function as a substrate for supporting the wavelength converter 6 instead of the substrate 71 and the vapor chamber 72. In other words, the rotating body 7J has a substrate as the vapor chamber 74.

Similarly to the vapor chamber 72 related to the first embodiment, the vapor chamber 74 is a heat transport body for receiving and then transporting the heat of the wavelength converter 6, and supports the wavelength converter 6. The vapor chamber 74 is provided with a sealed container 741.

The sealed container 741 is formed of metal, and contains the working fluid capable of changing between the liquid phase and the vapor phase.

The sealed container 741 has a surface 7411 at the −D direction side and a surface 7412 at the +D direction side, and in addition, has an incident side opening 7413, an exit side opening 7414, an incident side light transmissive member 7415, an exit side light transmissive member 7416, and an inner surface 7417.

The incident side opening 7413 is disposed on the surface 7411, and the exit side opening 7414 is disposed on the surface 7412. The incident side opening 7413 and the exit side opening 7414 are disposed at an incident position of the excitation light EL in the vapor chamber 74 which rotates. In other words, in the vapor chamber 74, an area where the incident side opening 7413 and the exit side opening 7414 are disposed is a light transmission area capable of transmitting light.

The incident side light transmissive member 7415 and the exit side light transmissive member 7416 are each a light transmissive member having a ring-like shape centering on the rotational axis Rx. The incident side light transmissive member 7415 closes the incident side opening 7413, and the exit side light transmissive member 7416 closes the exit side opening 7414. On the surface at the +D direction side of the exit side light transmissive member 7416, there is arranged the wavelength converter 6.

The inner surface 7417 is an inner surface at the outer circumferential side in the sealed container 741. The inner surface 7417 is arranged at the outer side in the radial direction centering on the rotational axis Rx from the wavelength converter 6. Therefore, when the rotating body 7J is rotated centering on the rotational axis Rx, the working fluid in the liquid phase is retained in a portion from a part corresponding to the wavelength converter 6 to the inner surface 7417. In other words, when the rotating body 7J is rotated, the working fluid in the liquid phase located inside the sealed container 741 moves closer to the outer circumferential side of the sealed container 741 than the incident area which the excitation light EL enters on the plane of incidence 63 of the wavelength converter 6. Thus, it is possible to efficiently supply the working fluid in the liquid phase to the heat receiver 742 arranged in the portion corresponding to the wavelength converter 6, and in addition, it is possible to prevent the working fluid in the liquid phase from blocking the excitation light.

In such a sealed container 741, the heat receiver 742 is disposed at a position corresponding to the wavelength converter 6. In other words, the heat receiver 742 is disposed at an arrangement position of the incident side light transmissive member 7415. Further, in the sealed container 741, the heat dissipaters 743 are respectively disposed in an inside portion of the wavelength converter 6 on the surface 7412 when viewed from the +D direction side, and on the surface 7411 at the −D direction side.

It should be noted that when the radiator fin 8 is disposed on the surface 7412 at the +D direction side, the radiator fin 8 is arranged in the inside of an inner edge of the wavelength converter 6. In contrast, when the radiator fin 8 is disposed on the surface 7411 at the −D direction side, the radiator fin 8 is arranged in the inside of an end edge at the rotational axis Rx side of the incident side opening 7413.

It is possible for the projector related to the present embodiment described hereinabove to exert substantially the same advantages as those of the projector 1 according to the first and fourth embodiments.

Modification of Fifth Embodiment

In the wavelength conversion device 4J described above, it is assumed that the wavelength converter 6 is arranged on the surface at the +D direction side of the exit side light transmissive member 7416. However, this is not a limitation, and it is possible for the wavelength converter 6 to be disposed on the surface at the −D direction side in the incident side light transmissive member 7415.

Further, when the wavelength converter 6 has a predetermined strength similarly to the wavelength converter 6E, it is possible to close corresponding one of the incident side opening 7413 and the exit side opening 7414 with the wavelength converter 6 instead of the exit side light transmissive member 7416 or the incident side light transmissive member 7415.

Modifications of Embodiments

The present disclosure is not limited to each of the embodiments described above and the modifications of each of the embodiments described above, but modifications, improvements, and so on in a range in which the advantages of the present disclosure can be achieved are included in the present disclosure.

For example, the configurations of the wavelength conversion devices 4A through 4J described in the embodiments and modified examples of the embodiments can be combined with each other. Further, the configurations and arrangements of the motor, the wavelength converter, the rotating body, and the radiator fin provided to the wavelength conversion devices 4A through 4J can arbitrarily be changed.

For example, in the wavelength conversion device, the radiator fin is not necessarily required.

Further, for example, in the wavelength conversion device, the motor can be arranged at an opposite side to the incident side of the excitation light with respect to the rotating body. Further, the motor is not necessarily required to penetrate the rotating body along the rotational axis. The motor is not required to be provided with the insertion part as, for example, the motor 5B, and the substrate 71 provided to the rotating body is not required to be provided with the through opening 714 through which a part of the motor is inserted. Further, it is possible to combine the configurations of at least two wavelength conversion devices with each other out of the wavelength conversion devices 4A through 4J described above.

Further, it is assumed that the wavelength converter 6 has the ring-like shape, but is not limited to a complete ring-like shape. It is possible to use a configuration of using the excitation light as the blue light in order to adjust the white balance. Specifically, the rotating body is provided with a light transmissive part formed of a transmission window where the wavelength converter 6 is absent, or formed of a cutout. Therefore, the ring-like shape is formed with areas respectively formed of the light transmission section and the phosphor, or areas obtained by dividing each of the light transmission section and the phosphor into a plurality of areas. The wavelength converter 6 disposed so as to form a ring-like shape in the present disclosure includes the above.

In each of the embodiments described above, it is assumed that the light source device 31 is provided with the first light source device 311 which is provided with the light source 312 and any one of the wavelength conversion devices 4A through 4J, and which emits the converted light as the fluorescence, the second light source device 317 for emitting the blue light, and the light combining device 318 for combining the converted light and the blue light with each other.

However, the configuration of the light source device 31 is not limited to the configuration described above.

In each of the embodiments described above, it is assumed that the light source device 31 constitutes the projector. However, this is not a limitation, and it is possible to adopt the light source device 31 as an illumination device. Specifically, the wavelength conversion device according to the present disclosure is not limited to the example of applying the wavelength conversion device to the projector and the light source device, but can be adopted as other electronic equipment.

Conclusion of Present Disclosure

Hereinafter, the conclusion of the present disclosure will supplementarily be noted.

Supplementary Note 1

A wavelength conversion device including a rotating body having a disk-like shape, a wavelength converter having a plane of incidence and an exit surface, and disposed in a portion at circumferential edge side of the rotating body so as to form a ring-like shape centering on a rotational axis of the rotating body, excitation light entering the plane of incidence, the exit surface being arranged at an opposite side to the plane of incidence, and the exit surface emitting converted light obtained by performing a wavelength conversion on the excitation light, and a motor configured to rotate the rotating body, wherein the rotating body includes a vapor chamber, the vapor chamber includes a sealed container configured to contain a working fluid changing in phase between a vapor phase and a liquid phase, the sealed container includes a heat receiver which is arranged in an outer circumferential part of the sealed container, and which is configured to receive heat of the wavelength converter, and a heat dissipater which is arranged at the rotational axis side of the heat receiver, and which is configured to release the heat received by the heat receiver, the working fluid in the liquid phase is changed to the liquid phase due to the heat received by the heat receiver, and the working fluid in the vapor phase is condensed by the heat dissipater.

According to such a configuration, by making the excitation light enter the plane of incidence of the wavelength converter, it is possible to emit the converted light obtained by performing the wavelength conversion on the excitation light from the exit surface.

Further, when the heat generated by the wavelength converter having a ring-like shape disposed in a portion at the circumferential edge side of the rotating body is received by the heat receiver of the vapor chamber of the rotating body, the working fluid in the liquid phase located inside the sealed container changes to the vapor phase in the heat receiver due to the heat thus received. The working fluid having changed to the vapor phase rapidly diffuses inside the sealed container. Thus, the heat diffuses inside the entire sealed container. Out of the working fluid in the vapor phase diffused inside the sealed container, a part of the working fluid in the vapor phase reaches the heat dissipater arranged at the rotational axis side of the heat receiver, then transfers the heat to the heat dissipater to thereby be condensed, and changes to the working fluid in the liquid phase.

Meanwhile, the heat dissipater is cooled by the ambient air surrounding the rotating body. By such a heat transfer cycle being repeated inside the vapor chamber, the rise in temperature of the wavelength converter is suppressed.

Thus, since the rise in temperature of the wavelength converter can be suppressed even when increasing the intensity of the excitation light entering the wavelength converter, it is possible to prevent the wavelength conversion efficiency of the excitation light by the wavelength converter from decreasing, and in addition, it is possible to prevent the life of the wavelength converter from shortening. Therefore, even when increasing the intensity of the excitation light entering the wavelength converter, and increasing an exit amount of the converted light, it is possible to prevent the deterioration of the wavelength converter, and thus, it is possible to increase the wavelength conversion efficiency of the excitation light.

Further, when the rotating body is rotated centering on the rotational axis, the working fluid in the liquid phase is apt to be moved toward the circumferential edge in the sealed container due to the centrifugal force. In contrast, since the heat receiver for receiving the heat of the wavelength converter is arranged in the outer circumferential portion of the sealed container, it is possible to make it easy to move the working fluid in the liquid phase to the heat receiver. Therefore, since it is possible to promote the evaporation of the working fluid in the liquid phase due to the heat transferred from the wavelength converter, it is possible to increase the cooling efficiency of the wavelength converter.

Supplementary Note 2

In the wavelength conversion device described in Supplementary Note 1, the rotating body includes a substrate having a disk-like shape, the wavelength converter is arranged at a circumferential edge side of the substrate in the substrate, and the heat receiver is disposed at a position closer to the rotational axis of the substrate than an area which the excitation light enters of the wavelength converter.

According to such a configuration, since the wavelength converter is arranged at the circumferential edge side of the substrate, it is possible to increase the length in the circumferential direction centering on the rotational axis in the wavelength converter compared to when arranging the wavelength converter at the rotational axis side. Thus, since it is possible to spread the portions which generate heat due to the excitation light entering the wavelength converter in the wavelength converter, it is possible to suppress the rise in temperature of the wavelength converter.

Further, the heat generated in the wavelength converter is received by the heat receiver arranged at the rotational axis side of the wavelength converter. As described above, the heat received by the heat receiver is released in the heat dissipater arranged at the rotational axis side. Since the wavelength converter is arranged at the circumferential edge side of the substrate, it is possible to enlarge the area of a portion which is located at the rotational axis side, and in which the heat dissipater is arranged, and it is possible to enlarge the radiation area of the heat transferred from the wavelength converter. Therefore, since it is possible to increase the cooling efficiency of the wavelength converter, it is possible to prevent the deterioration of the wavelength converter, and in addition, it is possible to increase the wavelength conversion efficiency of the excitation light by the wavelength converter.

Supplementary Note 3

In the wavelength conversion device described in Supplementary Note 2, the motor is arranged at an incident side of the excitation light with respect to the substrate, and the vapor chamber is arranged at the incident side of the excitation light with respect to the substrate.

According to such a configuration, it is possible to transfer the heat generated in the motor to the vapor chamber. Therefore, it is possible to increase the cooling efficiency of the motor.

Supplementary Note 4

In the wavelength conversion device described in Supplementary Note 3, the motor is coupled to the vapor chamber.

According to such a configuration, it is possible to prevent the radiation area of the vapor chamber from decreasing compared to the configuration in which the motor penetrates the vapor chamber. Therefore, it is possible to increase the cooling efficiency of the wavelength converter.

Supplementary Note 5

In the wavelength conversion device described in Supplementary Note 3, the vapor chamber has a through opening configured to penetrate the vapor chamber along the rotational axis, and the motor is coupled to the substrate through the through opening.

According to such a configuration, it is possible to make the vapor chamber closer to the heat generation portion in the motor. Therefore, it is possible to make it easy to transfer the heat to the vapor chamber from the motor, and therefore, it is possible to increase the cooling efficiency of the motor.

Supplementary Note 6

In the wavelength conversion device described in Supplementary Note 2, the motor is arranged at an incident side of the excitation light with respect to the substrate, and the wavelength converter and the vapor chamber are arranged at an opposite side to the incident side of the excitation light with respect to the substrate.

According to such a configuration, it is possible to shorten the path of the heat transferred from the wavelength converter to the vapor chamber via the substrate compared to when the wavelength converter is arranged at the opposite side to the incident side of the excitation light with respect to the substrate, and the vapor chamber is arranged at the incident side of the excitation light with respect to the substrate. Thus, it is possible to make it easy to transfer the heat to the vapor chamber from the wavelength converter, and it is possible to increase the cooling efficiency of the wavelength converter.

Further, it is possible to decrease the dimension of the wavelength conversion device in a direction along the rotational axis compared to when one of the wavelength converter and the vapor chamber is arranged at the incident side of the excitation light with respect to the substrate, and the other thereof is arranged at the opposite side to the incident side of the excitation light with respect to the substrate.

Supplementary Note 7

In the wavelength conversion device according to any one of Supplementary Note 2 through Supplementary Note 6, the substrate has a light transmission area through which the excitation light is transmitted, the wavelength converter is arranged in accordance with the light transmission area in the substrate, and the vapor chamber is disposed at the rotational axis side of the wavelength converter.

According to such a configuration, when the wavelength converter is arranged at the opposite side to the incident side of the excitation light with respect to the substrate, it is possible to make the excitation light enter the wavelength converter via the light transmission area.

Further, when the wavelength converter is arranged at the incident side of the excitation light with respect to the substrate, it is possible to emit the converted light emitted from the wavelength converter toward the opposite side to the incident side of the excitation light with respect to the substrate via the light transmission area. In these cases, since the vapor chamber is arranged at the rotational axis side of the wavelength converter, it is possible to prevent the vapor chamber from blocking the excitation light and the converted light.

Supplementary Note 8

In the wavelength conversion device described in Supplementary Note 7, the substrate has a light transmissive property, and the excitation light enters the wavelength converter via the rotating body.

According to such a configuration, since the whole of the substrate transmits the light, it is not necessary to make the wavelength converter project toward the outer side in the radial direction centering on the rotational axis than the rotating body in order to make the excitation light enter the wavelength converter and in order to emit the converted light. Therefore, it is possible to achieve reduction in size of the wavelength conversion device in the radial direction centering on the rotational axis.

Further, it results in that the wavelength converter is arranged at the opposite side to the incident side of the excitation light with respect to the rotating body. According to the above, when the collecting lens is arranged in the posterior stage of the wavelength conversion device, it is possible to shorten the distance between the wavelength converter and the collecting lens. Therefore, it is possible to make it easy for the collecting lens to collect the converted light emitted from the wavelength converter.

Supplementary Note 9

In the wavelength conversion device described in Supplementary Note 7, the substrate is formed of the vapor chamber having a disk-like shape including the sealed container having a light transmissive property, the wavelength converter is provided to the vapor chamber, the sealed container houses the working fluid having a light transmissive property, and the excitation light enters the wavelength converter via the vapor chamber.

According to such a configuration, the substrate on which the wavelength converter is arranged is formed of the vapor chamber. According to the above, it is possible to decrease the number of components of the rotating body compared to when the rotating body is provided with the substrate and the vapor chamber separately from each other.

Further, since the heat generated by the wavelength converter is directly transferred to the vapor chamber, it is possible to increase the heat transfer efficiency from the wavelength converter to the vapor chamber. Therefore, it is possible to increase the cooling efficiency of the wavelength converter.

Supplementary Note 10

In the wavelength conversion device described in Supplementary Note 9, when the rotating body is rotated, the working fluid in the liquid phase moves to an outer circumferential side of the incident area which the excitation light enter on the plane of incidence.

According to such a configuration, due to the centrifugal force generated by the rotation of the rotating body, the working fluid in the liquid phase moves toward the outer circumferential side of the incident area on the plane of incidence of the wavelength converter. According to the above, it is possible to make the excitation light enter the wavelength converter without irregularly reflecting the excitation light by the working fluid in the liquid phase. Therefore, it is possible to prevent the wavelength conversion efficiency of the excitation light from decreasing.

Supplementary Note 11

In the wavelength conversion device according to any one of Supplementary Note 2 through Supplementary Note 6, the wavelength converter is disposed so as to project outward from a circumferential edge of the substrate.

According to such a configuration, since the excitation light and the converted light are not transmitted through the rotating body, it is possible to prevent the loss of the excitation light and the converted light caused by being transmitted through the rotating body from occurring.

Further, since the wavelength converter projects to the outer side from the circumferential edge of the rotating body, it is possible to make it easy to increase the dimension in the circumferential direction centering on the rotational axis in the wavelength converter. Thus, since it is possible to spread the portions which generate heat due to the excitation light entering the wavelength converter in the wavelength converter, it is possible to suppress the rise in temperature of the wavelength converter.

Supplementary Note 12

In the wavelength conversion device described in Supplementary Note 11, the substrate is formed of the vapor chamber having a disk-like shape.

According to such a configuration, since it is possible to make it easy to transfer the heat to the vapor chamber from the wavelength converter, it is possible to increase the cooling efficiency of the wavelength converter. Besides the above, it is possible to decrease the number of components of the rotating body compared to when the rotating body is provided with the substrate and the vapor chamber separately from each other.

Supplementary Note 13

In the wavelength conversion device described in one of Supplementary Note 11 or Supplemental Note 12, the wavelength converter is disposed on a surface at an opposite side to the motor in the rotating body.

According to such a configuration, it is possible to prevent the wavelength converted light from being blocked by the rotating body, and in addition, when the collecting lens is arranged in the posterior stage of the wavelength conversion device, it is possible to shorten the distance between the wavelength converter and the collecting lens. Therefore, it is possible to make it easy for the collecting lens to collect the converted light emitted from the wavelength converter.

Supplementary Note 14

In the wavelength conversion device according to any one of Supplementary Note 11 through Supplementary Note 13, the wavelength converter includes a reflecting layer which constitutes the plane of incidence, which transmits the excitation light, and which reflects the converted light, and the plane of incidence is exposed to an outside.

According to such a configuration, by the plane of incidence being exposed to the outside, it results in that the plane of incidence makes contact with the air layer. Therefore, it is possible to prevent the excitation light on which the wavelength conversion has not been performed from being emitted to the outside of the wavelength converter from the reflecting layer due to the refractive index difference between the air layer and the reflecting layer. In other words, at least a part of the excitation light which is emitted to the outside from the reflecting layer to thereby be lost can totally be reflected by the interface between the reflecting layer and the air layer. Therefore, it is possible to increase the use efficiency of the excitation light in the wavelength converter.

Supplementary Note 15

In the wavelength conversion device according to any one of Supplementary Note 1 through Supplementary Note 14, there is further included a radiator fin configured to release the heat transferred from the vapor chamber.

According to such a configuration, it is possible to enlarge the radiation area for the heat transferred from the vapor chamber using the radiator fin. In other words, it is possible to enlarge the radiation area for the heat transferred from the wavelength converter. Therefore, it is possible to increase the cooling efficiency of the wavelength converter.

Supplementary Note 16

A light source device including a light source configured to output excitation light, and the wavelength conversion device described in any one of Supplemental Note 1 through Supplemental Note 15 configured to output the converted light obtained by converting a wavelength of the excitation light.

According to such a configuration, since it is possible to exert substantially the same advantages as those of the wavelength conversion device described above, it is possible to make the light source device stably operate while increasing the intensity of the light emitted from the light source device.

Supplementary Note 17

A projector including projecting modulated light obtained by modulating the light emitted from the light source device described in Supplementary Note 16.

According to such a configuration, since it is possible to exert substantially the same advantages as those of the light source device described above, it is possible to stably project image light increased in luminance.

What is claimed is:

1. A wavelength conversion device comprising:

a rotating body having a disk-like shape;

a wavelength converter having a plane of incidence and an exit surface, and disposed in a portion at circumferential edge side of the rotating body so as to form a ring-like shape centering on a rotational axis of the rotating body, excitation light entering the plane of incidence, the exit surface being arranged at an opposite side to the plane of incidence, and the exit surface emitting converted light obtained by performing a wavelength conversion on the excitation light; and a motor configured to rotate the rotating body, wherein the rotating body includes a vapor chamber, the vapor chamber includes a sealed container configured to contain a working fluid changing in phase between a vapor phase and a liquid phase, the sealed container includes a heat receiver which is arranged in an outer circumferential part of the sealed container, and which is configured to receive heat of the wavelength converter, and a heat dissipater which is arranged at the rotational axis side of the heat receiver, and which is configured to release the heat received by the heat receiver, the working fluid in the liquid phase is changed to the liquid phase due to the heat received by the heat receiver, and the working fluid in the vapor phase is condensed by the heat dissipater, the rotating body includes a substrate having a disk-like shape, the wavelength converter is arranged at a circumferential edge side of the substrate in the substrate, the heat receiver is disposed at a position closer to the rotational axis of the substrate than an incident area which the excitation light enters of the wavelength converter, the motor is arranged at an incident side of the excitation light with respect to the substrate, the vapor chamber is arranged at the incident side of the excitation light with respect to the substrate, the vapor chamber has a through opening configured to penetrate the vapor chamber along the rotational axis, and the motor is coupled to the substrate through the through opening.

2. The wavelength conversion device according to claim 1, wherein the motor is coupled to the vapor chamber.

3. The wavelength conversion device according to claim 1, wherein the motor is arranged at an incident side of the excitation light with respect to the substrate, and the wavelength converter and the vapor chamber are arranged at an opposite side to the incident side of the excitation light with respect to the substrate.

4. The wavelength conversion device according to claim 1, wherein the substrate has a light transmission area through which the excitation light is transmitted, the wavelength converter is arranged in accordance with the light transmission area in the substrate, and the vapor chamber is disposed at the rotational axis side of the wavelength converter.

5. The wavelength conversion device according to claim 4, wherein the substrate has a light transmissive property, and the excitation light enters the wavelength converter via the rotating body.

6. The wavelength conversion device according to claim 5, further comprising:

a radiator fin which is disposed at the rotational axis side of the wavelength converter, and which is configured to release heat transferred from the vapor chamber.

7. The wavelength conversion device according to claim 4, wherein the substrate is formed of the vapor chamber having a disk-like shape including the sealed container having a light transmissive property, the wavelength converter is provided to the vapor chamber, the sealed container houses the working fluid having a light transmissive property, and the excitation light enters the wavelength converter via the vapor chamber.

8. The wavelength conversion device according to claim 7, wherein when the rotating body is rotated, the working fluid in the liquid phase moves to an outer circumferential side of the incident area which the excitation light enter on the plane of incidence.

9. The wavelength conversion device according to claim 8, further comprising:

a radiator fin which is disposed at the rotational axis side of the wavelength converter, and which is configured to release heat transferred from the vapor chamber.

10. The wavelength conversion device according to claim 1, wherein the wavelength converter has a projection area configured to project outward from a circumferential edge of the substrate, and an incident area which the excitation light enters is formed in the projection area.

11. The wavelength conversion device according to claim 10, wherein the substrate is constituted by a metallic substrate having a disk-like shape, and having a first surface to which the wavelength converter is fixed, and the vapor chamber having a disk-like shape, and fixed to a second surface at an opposite side to the first surface of the metallic substrate.

12. The wavelength conversion device according to claim 11, wherein the wavelength converter is formed of a phosphor ceramic as a ceramic including phosphor particles, and the first surface of the substrate is exposed at the rotational axis side of the wavelength converter, and is configured to release the heat received from the wavelength converter.

13. The wavelength conversion device according to claim 11, further comprising:

a radiator fin disposed on a surface at an opposite side to the substrate of the vapor chamber, and is configured to release heat transferred from the vapor chamber.

14. The wavelength conversion device according to claim 11, wherein the wavelength converter includes a reflecting layer which constitutes the plane of incidence, which transmits the excitation light, and which reflects the converted light.

15. The wavelength conversion device according to claim 10, wherein the wavelength converter is disposed on a surface at an opposite side to the motor in the rotating body.

16. A light source device comprising:

a light source configured to output excitation light; and the wavelength conversion device according to claim 1 configured to output the converted light obtained by converting a wavelength of the excitation light.

17. A projector comprising:

projecting modulated light obtained by modulating the light emitted from the light source device according to claim 16.

* * * * *